United States Patent
Weller et al.

(10) Patent No.: US 11,052,383 B2
(45) Date of Patent: *Jul. 6, 2021

(54) NON-PRECIOUS METAL-BASED HYRDOSILYLATION CATALYSTS EXHIBITING IMPROVED SELECTIVITY

(71) Applicants: Momentive Performance Materials Inc., Waterford, NY (US); PRINCETON UNIVERSITY, Princeton, NJ (US)

(72) Inventors: Keith James Weller, Rensselear, NY (US); Crista Carmen H. Atienza, Houston, TX (US); Julie Boyer, Columbia, MD (US); Paul Chirik, Princeton, NJ (US); Johannes G. P. Delis, Bergen op Zoom (NL); Kenrick Lewis, Flushing, NY (US); Susan A. Nye, Feura Bush, NY (US)

(73) Assignees: MOMENTIVE PERFORMANCE MATERIALS INC., Waterford, NY (US); PRINCETON UNIVERSITY, Princeton, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/715,324

(22) Filed: Sep. 26, 2017

(65) Prior Publication Data

US 2018/0015449 A1 Jan. 18, 2018

Related U.S. Application Data

(63) Continuation of application No. 13/325,250, filed on Dec. 14, 2011, now Pat. No. 9,782,763.

(51) Int. Cl.
*B01J 31/18* (2006.01)

(52) U.S. Cl.
CPC ...... *B01J 31/1805* (2013.01); *B01J 2231/323* (2013.01); *B01J 2531/0244* (2013.01); *B01J 2531/72* (2013.01); *B01J 2531/842* (2013.01); *B01J 2531/845* (2013.01); *B01J 2531/847* (2013.01)

(58) Field of Classification Search
None
See application file for complete search history.

(56) References Cited

U.S. PATENT DOCUMENTS

| | | |
|---|---|---|
| 3,159,601 A | 12/1964 | Ashby et al. |
| 3,220,972 A | 11/1965 | Lamoreaux |
| 3,296,291 A | 1/1967 | Chalk et al. |
| 3,775,452 A | 11/1973 | Karstedt |
| 3,928,629 A | 12/1975 | Chandra et al. |
| 4,550,152 A | 10/1985 | Faltynek |
| 4,572,791 A | 2/1986 | Onopchenko et al. |
| 4,578,497 A | 3/1986 | Onopchenko et al. |
| 4,729,821 A | 3/1988 | Timmons et al. |
| 4,788,312 A | 11/1988 | Paciorek et al. |
| 5,026,893 A | 6/1991 | Paciorek |
| 5,166,298 A | 11/1992 | Friedman et al. |
| 5,331,075 A | 7/1994 | Sumpter et al. |
| 5,432,140 A | 7/1995 | Sumpter et al. |
| 5,866,663 A | 2/1999 | Brookhart et al. |
| 5,955,555 A | 9/1999 | Bennett |
| 6,103,946 A | 8/2000 | Brookhart et al. |
| 6,214,761 B1 | 4/2001 | Bennett |
| 6,265,497 B1 | 7/2001 | Herzig |
| 6,278,011 B1 | 8/2001 | Chen et al. |
| 6,281,303 B1 | 10/2001 | Lavoie et al. |
| 6,297,338 B1 | 10/2001 | Cotts et al. |
| 6,417,305 B2 | 7/2002 | Bennett |
| 6,423,848 B2 | 7/2002 | Bennett |
| 6,432,862 B1 | 8/2002 | Bennett |
| 6,451,939 B1 | 9/2002 | Britovsek |
| 6,455,660 B1 | 9/2002 | Clutton et al. |
| 6,458,739 B1 | 10/2002 | Kimberley et al. |
| 6,458,905 B1 | 10/2002 | Schmidt et al. |
| 6,461,994 B1 | 10/2002 | Gibson et al. |
| 6,472,341 B1 | 10/2002 | Kimberley et al. |
| 6,620,895 B1 | 9/2003 | Cotts et al. |
| 6,657,026 B1 | 12/2003 | Kimberley et al. |
| 7,053,020 B2 | 5/2006 | DeBoer et al. |
| 7,148,304 B2 | 12/2006 | Kimberley et al. |
| 7,161,005 B2 | 1/2007 | Schlingloff et al. |
| 7,247,687 B2 | 7/2007 | Cherkasov et al. |
| 7,268,096 B2 | 9/2007 | Small et al. |
| 7,429,672 B2 | 9/2008 | Lewis et al. |
| 7,442,819 B2 | 10/2008 | Ionkin et al. |
| 7,456,285 B2 | 11/2008 | Schlingloff et al. |
| 7,696,269 B2 | 4/2010 | Cruse et al. |
| 8,236,915 B2 | 8/2012 | Delis et al. |
| 8,415,443 B2 | 4/2013 | Delis et al. |
| 2002/0058584 A1 | 5/2002 | Bennett |
| 2004/0116566 A1* | 6/2004 | Fehn ............... C07F 7/21 524/261 |
| 2006/0263675 A1 | 11/2006 | Adzic et al. |
| 2007/0264189 A1 | 11/2007 | Adzic et al. |
| 2008/0262225 A1 | 11/2008 | Schlingloff et al. |
| 2008/0293878 A1 | 11/2008 | Funk et al. |
| 2009/0068282 A1 | 3/2009 | Schlingloff et al. |

(Continued)

FOREIGN PATENT DOCUMENTS

| | | |
|---|---|---|
| CN | 1727349 | 2/2006 |
| EP | 0786463 | 7/1997 |

(Continued)

OTHER PUBLICATIONS

Marciniec et al. Organosilicon Chemistry V: From Molecules to Materials, Chapter 67, 2003, pp. 415-419.*

(Continued)

*Primary Examiner* — Clinton A Brooks
(74) *Attorney, Agent, or Firm* — McDonald Hopkins LLC; Joseph Waters

(57) ABSTRACT

Disclosed herein is the use of manganese, iron, cobalt, or nickel complexes containing tridentate pyridine di-imine ligands as hydrosilylation catalysts. These complexes are effective for efficiently catalyzing hydrosilylation reactions, as well as offering improved selectivity and yield over existing catalyst systems.

14 Claims, No Drawings

(56) References Cited

U.S. PATENT DOCUMENTS

| | | |
|---|---|---|
| 2009/0296195 A1 | 12/2009 | Fontana et al. |
| 2011/0009565 A1 | 1/2011 | Delis et al. |
| 2011/0009573 A1 | 1/2011 | Delis et al. |
| 2012/0130021 A1 | 5/2012 | Tondreau et al. |
| 2012/0130105 A1* | 5/2012 | Lewis .................. C07F 15/025 556/456 |
| 2012/0130106 A1 | 5/2012 | Lewis et al. |
| 2013/0158281 A1 | 6/2013 | Weller et al. |

FOREIGN PATENT DOCUMENTS

| | | |
|---|---|---|
| GB | 2013207 | 8/1979 |
| TW | 200902541 | 1/2009 |
| WO | 9210544 | 6/1992 |
| WO | 2002088289 | 11/2002 |
| WO | 2003042131 | 5/2003 |
| WO | 2008085453 | 7/2008 |
| WO | 2011006044 | 1/2011 |
| WO | 2012/007139 | 1/2012 |
| WO | 2012071359 | 5/2012 |
| WO | 2013/043783 | 3/2013 |
| WO | 2013043846 | 3/2013 |

OTHER PUBLICATIONS

Toma et al., J. Braz. Chem. Soc., vol. 7, No. 6, 391-394, 1996.
Suzuki, et al., "Random and block copolymerizations of norbornene with conjugated 1,3-dienes catalyzed by novel No compounds involving N- or O-donated ligands" Reactive & Functional Polymers 59 (2004) 253-266, May 6, 2004.
Ittel et al., DuPont's Versipol® Late Metal Polymerization Catalysts, http://www.nacatsoc.org/18nam/Orals/044-Ittel-DuPont's%20Versipol%C2%AE%20Late%20Metal%20Polymerization.pdf.
Seki et al., "Single-Operation Synthesis of Vinyl silanes from Alkenes and Hydrosilanes with the Aid of Ru (CO)12," Am. Chem. Soc., J. Org. Chem. 1986, 51, 3890-3895, Osaka, Japan.
Oro et al. "Hydrosilylation of Alkenese by Iridium Complexes," J. Mol. Catalysis, 1986, 37, 151-156.
Naumov et al., "Selective Dehydrogentative Silylation-Hydrogenation Reaction of Divinyldisiloxane with Hydrosilane Catalyzed by an Iron Complex," Journal of the American Chemical Society, 2012, vol. 134, Issue 2, 804-807, Osaka, Japan.
McAtee et al., "Preparation of Allyl and Vinyl Silanes by the Palladium-Catalyzed Silylation of Terminal Olefins: A Silyl-Heck Reaction**", Angewandte Chemie, Int. Ed. 2012, 51, 3663-3667.
Marciniec et al., "Competitve silylation of olefins with vinylsilanes and hydrosilanes photocatalyzed by iron carbonyl complexes," Inorg. Chem. Commun. 2000, 3, 371.
Lu et al., "Iridium-Catalyzed (Z)-Trialkylsilylation of Terminal Olefins," J. Org. Chem, 2010, 75, 1701-1705, Dallas, Texas.
Kuo, et al., "Electrochemical studies of nickel bis(2,2':6',2'-terpyridine) with alkyl/aryl/allyl bromides and activeated olefins in nonaqueous solvents" Jiemian Kexue Huishi, vol. 15, Issue 1, pp. 23-42, Journal, 1992, Coden: CMKCEW, ISSN: 1026-325X.
Kakiuchi et al., "Dehydrogenative Silylation of 1,5-Dienes with Hydrosilanes Catalyzed by RhCl (PPh3)3," Am. Chem. Soc., Organometallics, 1993, 12, 4748-4750, Kagawa, Japan.
Kakiuchi et al., "Completely Selective Synthesis of (E)-B-(triethylsilyl)styrenes by Fe3(CO)12-catalyzed Reaction of Styrenes With Triethylsilane," Journal of Organometallic Chemistry 1993, 456, 45-47, Osaka, Japan.
Humphries et al., "Investigations into the Mechanism of Activation and Initiation of Ethylene Polymerization by Bis (imino)pyridine Cobalt Catalysts: Synthesis, Structures, and Deuterium Labeling Studies," Organometallics 2005, 24, 2039-2050, London, United Kingdom.
Fernandez et al., "Synthesis and Reactions of Dihydrido(triethylallyl)(1,5-cycloctadiene)-Iridium(III) Complexes: Catalysts for Dehydrogneative Silylation of Alkenese," Organometallics, 1986, 5, 1519-1520.

Chen et al., "General Synthesis of Di-u-oxo Dimanganese Complexes as Functional Models for the Oxygen Evolving Complex of Photosystem II" Inorg. Chem. 2005, 44, 7661-7670.
Bowman et al., "Synthesis and Molecular and Electronic Structures of Reduced Bis(imino) pyridine Cobalt Dinitrogen Complexes: Ligand versus Metal Reduction," J. Am. Chem. Soc., 2010, 132, 1676-1684, Germany.
Anselment et al., "Activation of Late Transition Metal Catalysts for Olefin Polymerizations and Olefin/CO Copolymeriations," Dalton Transactions, vol. 34, pp. 4525-4672.
Atienza et al., "Improving the Conditions and Expanding the Scope of Bis(imino)pyridine Iron-Catalyzed Olefin Hydrosilyation." (Disertation) Chapter , pp. 318-362.
Kamata et al. "Catalytic Hydrosilylation of Alkenes by Iron Complexes Containing Terpyridine Derivatives as Ancillary Ligands," Organometallics, 2012, vol. 31, pp. 3825-3828.
Shaikh et al., "Iron-Catalyzed Enantioselevtive Hydrosilylation of Keytones," Angew. Chem. Int. Ed., 2008, 47, 2497-2501.
De Bo et al., "Hydrosilylation of Alkynes Mediated by N-heterocyclic Carben Platinum(0) Complexes," Organometallics, 2006, 25, 1881-1890.
Boudjouk et al., "Exclusive β-hydrosilylation of acrylates catalysed by copper-tetramethylethylenediamine , " Journal of Organometallic Chemistry, Jan. 1, 1993, pp. 41-43.
Brookhart et al., "Mechanism of a cobalt(III)-catalyzed olefin hydrosilation reaction: direct evidence for a silyl migration pathway," J. Am. Chem. Soc. 1993, 115, 2151.
Castro, Pascel M. et al., "Iron-Based Catalysts Bearing Bis(imido)-Pyridine Ligands for the Polymerization of tert-Butyl Acrylate," Journal of Polymer Science: Part A: Polymer Chemistry, vol. 41, pp. 1380-1389 (2003).
Cornish, et al., "Homogeneous catalysis: VI. Hydrosilylation using tri(pentanedionato)rhodium(III) or tetrakis(μ-acetato) Dirhodium(II) as Catalysts," Journal of Organometallic Chemistry, Elsevier-Sequoia S.A. Lausanne, CH, vol. 172, No. 2, Jun. 12, 1979 (Jun. 12, 1979), pp. 153-163.
Chuit et al. "Reactivity of penta- and hexacoordinate silicon compounds and their role as reaction intermediates," Chem. Rev. 1993, 93, 1371-1448.
Kaverin et al., "Reaction of Polar Olefins with Methyldichlorosilane on nickel-containing Catalytic Systems,"Chemical Abstracts Service, 1980, vol. 92, p. 622.
Doucette, "Homogeneous Iron Catalysts With Redox-Active Ligands: Synthesis and Electronic Structure," Dissertation Cornell University, Aug. 2006.
Doyle et al., "Addition/Elimination in the Rhodium(II) Perfluorobutyrate Catalyzed Hydrosilylationo of 1-Alkenes. Rhodium Hydride Promoted Isomerization and Hydrogenation," Organometallics, 1992, 11, 549-555, San Antonio, Texas.
Falck, J. R. et al. "Iridium-Catalyzed (Z)-Trialkylsilylation of Terminal Olefins," J. Org. Chem. 2010, 75, 1701.
Figgins et al., "Complexes of Iron(II), Cobalt(II) and Nickel(II) with Biacetyl-bis-methlylimine, 20Pyridinal-methylimine and 2,6-Pyridindial-bis-methylimine" J. Am. Chem. Soc. 1960, vol. 82, 820-824.
Gandon, et al., "Silicon-Hydrogen Bond Activation and Hydrosilylation of Alkenes Mediated by CpCo Complexes: A Theoretical Study," J. Am. Chem. Soc. 2009, 131, 3007.
Hori et al., "Ruthenium Complex-Catalyzed Silylation of Olefins. Selective Sysnthesis of Allysilanes," Bull. Chem. Soc. Jpn., 1988, 61, 3011-3013, Kyoto, Japan.
Itoh et al., "Disproportionation reactions of organohydrosilanes in the presence of base catalysts" J. Organomet. Chem., 2001, 629, 1-6.
Benkeser et al., "Chloroplatinic acid catalyzed additions of silanes to isoprene,"J. Organoment. Chem.1978,156, pp. 235-244.
Fruchtel et al; "Organic Chemistry on Solid Supports," Angewandte Chemie International Edition in English, 1996, vol. 35, Issue 1, pates 17-42.
Schmidt et al., "Heterogenized Iron (II) Complexes as Highly Active Ethene Polymerization Cayalysts," Journal of Molecular Catalysis A: Chemical, 2002, vol. 179, pp. 155-173.

(56) References Cited

OTHER PUBLICATIONS

Knijnenburg et al., "Olefin hydrogenation using diimine pyridine complexes of Co and Rh," Journal of Molecular Catalysis, 232 (2005), No. 1-2, pp. 151-159.

Marciniec, Bogdan, "Catalysis by Transition Metal Complexes of Alkene Silylation—Recent Progress and Mechanistic Implications," Coordination Chemistry Reviews, 249 (2009) 2374-2390.

Marciniec et al. "Encyclopedia of Catalysis" pp. 6,7, and 20, Mar. 5, 2010.

Martinez, Remi et al., "C—C Bond Formation via C—H Bond Activation Using an in Situ-Generated Ruthenium Catalyst," Journal of the American Chemical Society, vol. 131, pp. 7887-7895 (2009).

Shaikh et al., "A convenient and General Iron-Catalyzed Hydrosilylation of Aldehydes," Organic Letters 2007, vol. 9, No. 26, pp. 5429-5432.

Bareille et al., "First Titanium-Catalyzed anti-1,4-Hydrosilylation of Dienes," Organometallics, 2005, 24(24), 5802-5806.

Nishiyama et al., "An Iron-Catalysed Hydrosilylation of Ketones," Chem. Commun., Royal Society of Chemistry, 2007, 160-762.

Furuta et al., "Highly efficient catalytic system for hydrosilylation of ketones with iron(II) acetate-thiophenecarboxylate," Tetrahedron Letters, 2008, vol. 49, Issue 1, pp. 110-113.

Ojima et al., "Regioselective hydrosilylation of 1,3-dienes catalyzed by phosphine complexes of palladium and rhodium," J. Organomet. Chem. 1978, 157, 359-372.

Pettigrew, "Synthetic Lubricants and High Performance Fluids, Ch. 12 Silahydrcarbons" (second edition), L. R. Rudnick and L. R. Shubkin (Editors), Marcel Dekker, NY 1999, pp. 287-296.

Poyatos, Macarena et al., "Coordination Chemistry of a Modular N,C-Chelating Oxazole-Carbene Ligand and its Applications in Hydrosilylation Catalysis," Organometallics, vol. 25, pp. 2634-2641 (2006).

Reiff, W. M. et al., "Mono(2,2',2"-terpyridine) Complexes of Iron(II)," Journal of Inorganic Chemistry, vol. 8, No. 9, pp. 2019-2021 (1969).

Parker et al. "1,2-Selective Hydrosilylation of Conjugated Dienes," J. Am. Chem. Soc., 2014, 136 (13), pp. 4857-4860.

Woo et al., "Redistribution of Bos- and Tris(silyl)methanes Catalyzed by Red-Al," Bull. Korean. Chem. Soc. 1996, 17, 123-125.

Wu et al., "A Strategy for the Synthesis of Well-Defined Iron Catalysts and Application to Regioselective Diene Hydrosilylation," Journal of the American Chemical Society, vol. 132, No. 38. Sep. 29, 2010 (Sep. 29, 2010), pp. 13214-13216.

Yi, Chae S. et al., "Regioselective Intermolecular Coupling Reaction of Arylketones and Alkenes Involving C—H Bond Activation Catalyzed by an in Situ Formed Cationic Ruthenium Hydride Complex," Organometallics, vol. 28, pp. 4266-4268 (2009).

Zhang et al., "Ferrous and Cobaltous Chlorides Bearing 2,8-Bis(imino)quinolines: Highly Active Catalysts for Ethylene Polymerization at High Temperature," Organometallics, vol. 29, pp. 1168-1173 (2010).

Archer et al., "Arene Coordination in Bis(imino)pyridine Iron Complexes: Identification of Catalyst Deactivation Pathways in Iron-Catalyzed Hydrogenation and Hydrosilation," Organometallics, vol. 25, pp. 4269-4278 (2006).

Bowman et al., "Reduced N-Alkyl Substituted Bis(imino)pyridine Cobalt Complexes: Molecular and Electronic Structures for Compounds Varying by Three Oxidation States," Inorg. Chem. 2010, 49, 6110-6123, Germany.

Zhu et al., "A Measure for *-Donor and *-Acceptor Properties of Diiminepyridine-Type Ligands," Organometallics 2008, 27, 2699-2705.

Zhu et al., "(Py)2Co(CH2SiMe3)2 as an Easily Accessible Source of "CoR2"," Organometallics, 2010, 29 (8), 1897-1908.

Yeung, et al., "Cobalt and iron complexes of chiral C1- and C2-terpyridines: Synthesis, characterizationa dn use in catalytic asymmetric cyclopropanation of styrenes." Inorganica Chimica Acta 362 (2009) 3267-3273.

Bart et al., "Electronic Structure of Bis(imino)pyridine Iron Dichloride, Monochloride, and Neutral Ligand Complexes: A Combined Structural, Spectroscopic, and Computational Study," J. Am. Chem. Soc. 2006, 128, 13901-13912.

Bart et al., "Preparation and Molecular and Electronic Structures of Iron(0) Dinitrogen and Silane Complexes and Their Application to Catalytic Hydrogenation and Hydrosilation," Journal of the American Chemical Society, vol. 126, pp. 13794-13807 (2004).

Connelly et al., "Chemical Redox Agents for Organometallic Chemistry," Chem. Rev. 1996, 96, 877-910.

Atienza et al. "Synthesis, Electronic Structure, and Ethylene Polymerization Activity of Bis(imino)pyridine Cobalt Alkyl Cations," Agnewandte Chem. Int. Ed. 2011, 50, 8143-8147.

Glatz et al., "Terpyridine-Based Silica Supports Prepared by Ring-Opening Metathesis Polymerization for the Selective Extraction of Noble Metals," Journal of Chromatography A, vol. 1015, pp. 65-71 (2003).

Nagashima et al., "Dehydrogenative Silylation of Ketones with a Bifunctional Organosilane by Rhodium-Pybox Catalysts," Chem. Soc. of Jpn., Chemistry Letters, 1993, 347-350, Toyohashi, Aichi 441.

Hosokawa et al., "A Chiral Iron Complex Containing a Bis(oxazolinyl)phenyl Ligand: Preparation and Asymmetric Hydrosilylation of Ketones," Organometallics, 29, 5773-5775 (2010).

Kaul et al., "Immobilization of Bis(imino)pyridyliron (II) complexes on Silica," Organometallics, 2002, 21(1), 74-83.

Kim et al., "2,2':6',2"-Terpyridine and Bis(2,2':6',2"-terpyridine)Ruthenium(II) Complex on the Dendritic Periphery," Journal of Organometallic Chemistry, vol. 673, pp. 77-83 (2003).

Kroll et al., "Access to Heterogeneous Atom-Transfer Radical Polymerization (ATRP) Catalysts Based on Dipyridylamine and Terpyridine via Ring-Opening Metathesis Polymerization (ROMP)," Macromolecular Chemistry and Physics, vol. 202, pp. 645-653 (2001).

Field et al., "One-Pot Tandem Hydroamination/Hydrosilation Catalyzed by Cationic Iridium(I) Complexes," Organometallics, vol. 22, pp. 4393-4395, Sep. 25, 2003.

Dekamin et al., "Organocatalytic, rapid and facile cyclotrimerization of isocyanates using tetrabutylammonium phthalimide-N-oxyl and tetraethylammonium 2-(carbamoyl) benzoate under solvent-free conditions," Catalysis Communications 12 (2010) 226-230.

Nesmeyanov et al., "Addition, Substitution, and Telomerization Reactions of Olefins in the Presence of Metal Carbonyls or Colloidal Iron," Tetrahedron, vol. 17, pp. 61-68 (1962).

Pal, et al., "Preparation and hydrosilylation activity of a molybdenum carbonyl complex that features a pentadentate bis(amino)pyridine lignad," Inorg Chem. Sep. 2, 2014; 53(17):9357-65. doi: 10.1021/ic501465v. Epub Aug. 20, 2014.

Jairam et al., "Ester Hydrolysis with 2,6-di(pyrazol-3-yl)pyridines and their Co 11 Complexes in Homogeneous and Micellar Media," Journal of Inorganic Biochemistry 84, 2001, 113-118, Toronto, Ontario, Canada.

Buschbeck et al., "Triethylene Glycol Ether End-grafted Carbosilane Dendrimers: Synthesis and Complexation Behavior," Inorganic Chemistry Communications, vol. 7, pp. 1213-1216, Oct. 13, 2004.

Seckin, "Preparation and Catalytic Properties of a Ru(II) Coordinated Polyimide Supported by a Ligand Containing Terpyridine Units," Journal of Inorganic and Organometallic Polymers and Materials, Apr. 9, 2009, 19(2), 143-151.

Greenhalgh et al., "Iron-Catalysed Chemo-, Regio-, and Stereoselective Hydrosilylation of Alkens and Alkynes using a Bench-Stable Iron(II) Pre-Catalyst," Advanced Synthesis & Catalysis, 2014, vol. 356, pp. 584-590.

Speier et al., "The Addition of Silicon Hydrides to Olefinic Double Bonds. Part II. The Use of Group VIII Metal Catalysts," Journal of the American Chemical Society, vol. 79, pp. 974-979 (1956).

Speier et al., "The Addition of Silicon Hydridesto Olefinic Double Donds. Part II. The Use of Group VII Metal Catalysts," J. Am. Chem. Soc. 1957, vol. 79, 974.

Timpa, "Non-Innocent Pyridine Based Pincer Ligands and Their Role Catalysis" Nov. 1, 2010.

(56) References Cited

OTHER PUBLICATIONS

Tondreau, et al., "Enantiopure Pyridine Bis(oxazoline) "Pybox" and Bis(oxazoline) "Box" iron Dialkyl Complexes: Comparison to Bis(imino)pyridine Compounds and Application to Catalytic Hydrosilylation of Ketones," Organometallics, Jun. 9, 2009, 28(13), 3928-3940.

Tondreau, et al "Synthesis and electronic structure of cationic, neutral, and anionic bis (imino)pyridine iron alkyl complexes: evaluation of redox activity in single-component ethylene polymerization catalysts." J Am Chem Soc. Oct. 27, 2010; 132(42): 15046-59. doi: 10.1021/ja106575b.

Gibson et al., "The nature of the active species in bis(imino)pyridyl cobalt ethylene polymerisation catalysts," Chem. Commun., 2001, 2252-2253.

Wile, et al. "Reduction chemistry of aryl- and alkyl-substituted bis(imino)pyridine iron dihalide compounds: molecular and electronic structures of [(PDI)2Fe] derivatives." Inorg Chem May 4, 2009; 48(9):4190-200.

Small et al., "Highly Active Iron and Cobalt Catalysts for the Polymerization of Ethylene," J.Am. Chem. Soc. 1998, 120(16), pp. 4049-40450.

Abu-Surrah et al., "New bis(imino)pyridine-iron(II)- and cobalt(II)-based catalysts: synthesis, characterization and activity towards polymerization of ethylene" Journal of Organometallic Chemistry 648 (2002) 55-61.

Albon et al., "Metal Carbonyl Complexes Involving 2,6Bix[l-(phenylimino)ethyl]pyridine; Bidentate Corrdination of a Potentially Tridentate Ligand" Inorganica Chimica Acta, 159 (1989) 19-22.

Alyea et al., "Terdentate NNN Donor Ligands Derived from 2,6-Diacetylpyridine" Syn. React. Inorg. Metal-Org. Chem., 4(6), 535-544 (1974).

Bouwkamp, "Iron-Catalyzed [2π+2π] Cycloaddition of α,ω-Dienes the Importance of Redox-Active Supporting Ligands" Journal of the American Chemical Society, 2006, V128 N41, P13340-13341.

Britovsek et al., "Novel Olefin Polymerization Catalysts Based on Iron and Cobalt," Chem. Commun., 1998, 849-850.

Cetinkaya et al., "Ruthenium(ii) complexes with 2,6-pyridyl-diimine ligands: synthesis, characterization and catalytic activity in epoxidation reactions" Journal of Molecular Catalysis A: Chemical 142 (1999) 101-112.

Corey et al., "Reactions of Hydrosilanes with Transition-Metal Complexes: Formation of Stable Transition-Metal Silyl Compounds," Journal of Chemical Reviews, vol. 99, pp. 175-292 (1999).

Haarman et al., "Reactions of [RhCl(diene)]2 with Bi- and Terdentate Nitrogen Ligands. X-ray Structures of Five-Coordinate Complexes," Am. Chem. Soc., Organometallics 1997, 16, 54-67.

Kickelbick et al., New J. Chem., 2002, 26, 462-468.

Kooistra et al., Inorganica Chimica Acta 357 (2004) 2945-2952.

Lapointe, et al., "Mechanistic Studies of Palladium(II)-Catalyzed Hydrosiliation and Dehydrogenative Silation Reactions," J. Amer. Chem. Soc. 119 (1997), pp. 906-917.

Lewis et al., "Hydrosilylation Catalyzed by Metal Colloids: A Relative Activity Study," Organometallics, 9 (1990), 621-625.

Lions et al., J. Chem. Soc. (A) 1957, vol. 79, 2733-2738.

Lu et al., "The Molecular Structure of a Complex of a 2,6-Diimino-Pyridine as a Bidentate Liandd with Molybdenum Carbonyl" Inorganica Chimica Acta, 134 (1987) 229-232.

Pangborn et al., "Safe and Convenient Procedure for Solvent Purification," Oraganometallics, 15:1518 (1996).

Randolph, Claudia L. et al., "Photochemical Reactions of (η5-Pentamethylcyclopentadienyl)dicarbonyliron-Alkyl and Silyl Complexes: Reversible Ethylene Insertion into an Iron-Silicon Bond and Implications for the Mechanism of Transition-Metal-Catalyzed Hydrosilation of Alkenes," Journal of The American Chemical Society, vol. 108, pp. 3366-3374 (1986).

Russell et al., "Synthesis of Aryl-Substituted Bis(imino)pyridine Iron Dinitrogen Complexes," Inorg. Chem. 2010, 49, 2782-2792.

Sacconi et al., "High-spin Five-Co-Ordinate Nickel (II) and Cobald (II) Complexes with 2,6-Diacetylepyridinebis (imines)," J. Chem. Soc. (A), 1968, 1510-1515.

Tondreau et al., "Bis(imino)pyridine Iron Complexes for Aldehyde and Ketone Hydrosilylation," Am. Chem. Soc., 2008, vol. 10, No. 13, 2789-2792.

* cited by examiner

NON-PRECIOUS METAL-BASED HYRDOSILYLATION CATALYSTS EXHIBITING IMPROVED SELECTIVITY

CROSS-REFERENCE TO RELATED APPLICATIONS

This application is a continuation application of and claims priority to U.S. application Ser. No. 13/325,250 filed on Dec. 14, 2011, the entire disclosure of which is incorporated herein by reference.

FIELD OF THE INVENTION

This invention relates generally to the use of transition metal-containing compounds, more specifically to manganese, iron, cobalt, or nickel complexes containing tridentate pyridine di-imine ligands as efficient and selective hydrosilylation catalysts.

BACKGROUND OF THE INVENTION

Hydrosilylation chemistry, typically involving a reaction between a silyl hydride and an unsaturated organic group, is the basis for synthesis routes to produce commercial silicone-based products like silicone surfactants, silicone fluids and silanes as well as many addition cured products like sealants, adhesives, and silicone-based coating products. Heretofore, hydrosilylation reactions have been typically catalyzed by precious metal catalysts, such as platinum or rhodium metal complexes.

Various precious metal complex catalysts are known in the art. For example, U.S. Pat. No. 3,775,452 discloses a platinum complex containing unsaturated siloxanes as ligands. This type of catalyst is known as Karstedt's-catalyst. Other exemplary platinum-based hydrosilylation catalysts that have been described in the literature include Ashby's catalyst as disclosed in U.S. Pat. No. 3,159,601, Lamoreaux's catalyst as disclosed in U.S. Pat. No. 3,220,972, and Speier's catalyst as disclosed in Speier, et al., J. Am. Chem. Soc., 1957, 79, 974.

Recently, new and inexpensive non-precious metal-based complexes containing a tridentate nitrogen ligand have been found to selectively catalyze hydrosilylation reactions, as described in the U.S. Patent Application Publication Nos. 2011/0009573 and 2011/0009565, the contents of both publications incorporated herein by reference in their entireties. In addition to their low cost and high selectivity, the advantage of these catalysts is that they can catalyze hydrosilylation reactions at room temperature while precious metal-based catalysts typically work only at elevated temperatures.

A five-coordinate Fe(II) complex containing a pyridine di-imine (PDI) ligand with isopropyl substitution at the ortho positions of the aniline rings has been used to hydrosilylate an unsaturated hydrocarbon (1-hexene) with primary and secondary silanes such as $PhSiH_3$ or $Ph_2SiH_2$ (Bart, et al., J. Am. Chem. Soc., 2004, 126, 13794) (Archer, et al. Organometallics, 2006, 25, 4269). However, it was believed that these catalysts are only effective with the aforementioned primary and secondary phenyl-substituted silanes, and not with, for example, alkoxy substituted silanes such as $(EtO)_3SiH$.

SUMMARY OF THE INVENTION

In one embodiment, the present invention is related to a process for the hydrosilylation of a composition containing a silyl hydride and a compound containing at least one unsaturated group. The process includes the steps of: (i) contacting the composition with a complex of Formula (I), optionally in the presence of a solvent, to cause the silyl hydride to react with the compound containing at least one unsaturated group to produce a hydrosilylation product containing said complex, and (ii) optionally removing the complex from the hydrosilylation product, wherein the complex of Formula (I) is:

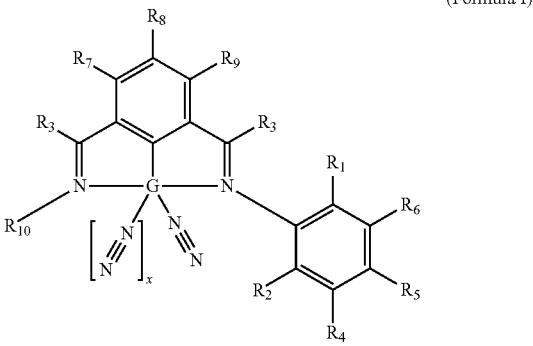

(Formula I)

wherein:
G is Mn, Fe, Ni, or Co;
x is 0 or 1;
each occurrence of $R_1$, $R_2$, $R_4$, $R_5$, $R_6$, $R_7$, $R_8$ and $R_9$ is independently H, C1-18 alkyl, C1-C18 substituted alkyl, aryl, substituted aryl, or an inert functional group;
each occurrence of $R_3$ is independently H, C1-C18 alkyl, C1-C18 substituted alkyl, or an inert functional group, wherein $R_1$ to $R_9$, other than hydrogen, optionally contain at least one heteroatom;
each occurrence of $R_{10}$ is C1-C18 alkyl, C1-C18 substituted alkyl, aryl or substituted aryl group, wherein $R_{10}$ optionally contains at least one heteroatom;
optionally any two of $R_1$, $R_2$, $R_3$, $R_4$, $R_5$, $R_6$, $R_7$, $R_8$, $R_9$ and $R_{10}$ vicinal to one another taken together may form a ring being a substituted or unsubstituted, saturated, or unsaturated cyclic structure;
wherein the silyl hydride is selected from the group consisting of $R^3{}_a(R^4O)_bSiH$ (Formula II), $Q_uT_vT_p{}^HD_wD^H{}_xM^H{}_yM_z$ (Formula III), $R_3Si(CH_2)_f(SiR_2O)_eSiR_2H$ (Formula XX), $(RO)_3Si(CH_2)_f(SiR_2O)_eSiR_2H$ (Formula XXI), and combinations thereof,
wherein Q is $SiO_{4/2}$, T is $R'SiO_{3/2}$, $T^H$ is $HSiO_{3/2}$, D is $R'_2SiO_{2/2}$, $D^H$ is $R'HSiO_{2/2}$, $M^H$ is $H_gR'_{3-g}SiO_{1/2}$, M is $R'_3SiO_{1/2}$,
each occurrence of $R^3$, $R^4$ and R' is independently C1-C18 alkyl, C1-C18 substituted alkyl, aryl, or substituted aryl, wherein $R^3$, $R^4$ and R' optionally contain at least one heteroatom;
a and b are integers 0 to 3, with the proviso that a+b=3, f has a value of 1 to 8, e has a value of 1 to 11, each g has a value of from 1 to 3, p is from 0 to 20, u is from 0 to 20, v is from 0 to 20, w is from 0 to 1000, x is from 0 to 1000, y is from 0 to 20, and z is from 0 to 20, provided that p+x+y equals 1 to 3000, and the valences of all of the elements in the silyl hydride are satisfied;
wherein the compound containing at least one unsaturated group is selected from the group consisting of an alkyne, a C2-C18 olefin, a cycloalkene, an unsaturated cycloalkane, an unsaturated cycloalkene, an unsaturated cycloalkyl epoxide, an unsaturated alkyl epoxide, a terminally unsaturated amine, an unsaturated aromatic hydrocarbon, an alkyl-capped allyl polyether, an unsaturated aryl ether, a vinyl-functionalized silane, a vinyl-functionalized silicone, a terminally unsaturated acrylate or methyl acrylate, a terminally unsaturated polyurethane polymer, and combinations thereof, with the proviso that when the complex of Formula (I) is iron, bis(dinitrogen)[N,N'-[(2,6-pyridinediyl κN)diethylidyne]bis[2,6-bis(1-methylethyl)benzenamine-κN]]—, (SP-5-13)-coordination compound and the silyl hydride is triethylsilane, the compound containing at least one unsaturated group cannot be an alkyl-capped allyl polyether or styrene; and when the complex of Formula (I) is iron, bis(dinitrogen)[N,N'-[(2,6-pyridinediyl κN)diethylidyne]bis[2,6-bis(1-methylethyl)benzenamine-κN]]—, (SP-5-13)-coordination compound and the silyl hydride is methylbis(trimethylsilyloxy)silane, the compound containing at least one unsaturated group cannot be an alkyl-capped allyl polyether.

In the present application, iron, bis(dinitrogen)[N,N'-[(2,6-pyridinediyl κN)diethylidyne]bis[2,6-bis(1-methyl ethyl)benzenamine-κN]]—, (SP-5-13)-coordination compound is represented by $(^{iPr}PDI)Fe(N_2)_2$. Its structure is shown below in the General Considerations section of the Examples.

In another aspect, the present invention relates to a process for the hydrosilylation of a composition containing a silyl hydride and a compound containing at least one unsaturated group using a complex of Formula (XIX) as the catalyst. The complex of Formula (XIX) is:

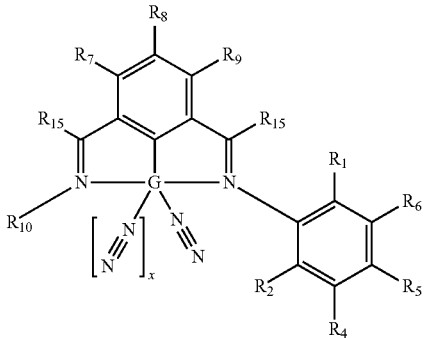

(Formula XIX)

wherein:

G is Mn, Fe, Ni, or Co;

x is 0 or 1;

each occurrence of $R_1$, $R_2$, $R_4$, $R_5$, $R_6$, $R_7$, $R_8$ and $R_9$ is independently H, C1-18 alkyl, C1-C18 substituted alkyl, aryl, substituted aryl, or an inert functional group;

each occurrence of $R_{15}$ is aryl or substituted aryl;

$R_1$, $R_2$, $R_4$, $R_5$, $R_6$, $R_7$, $R_8$, $R_9$, and $R_{15}$, other than hydrogen, optionally contain at least one heteroatom;

each occurrence of $R_{10}$ is C1-C18 alkyl, C1-C18 substituted alkyl, aryl or substituted aryl group, wherein $R_{10}$ optionally contains at least one heteroatom;

optionally any two of $R_1$, $R_2$, $R_{15}$, $R_4$, $R_5$, $R_6$, $R_7$, $R_8$, $R_9$ and $R_{10}$ vicinal to one another taken together may form a ring being a substituted or unsubstituted, saturated, or unsaturated cyclic structure.

In connection with the hydrosilylation process of using the complex of Formula (XIX) as the catalyst, suitable silyl hydride is $(R^4O)_3SiH$ (Formula XXII), wherein each occurrence of $R^4$ is independently C1-C18 alkyl, C1-C18 substituted alkyl, aryl, or substituted aryl, and $R^4$ optionally contains at least one heteroatom. Advantageously, the compound containing at least one unsaturated group is selected from the group consisting of a terminally unsaturated amine, an unsaturated aromatic hydrocarbon, an unsaturated cycloalkane, and combinations thereof.

In another aspect, the present invention relates to a process for selectively producing a mono-hydrosilylated product from a composition containing a silyl hydride and a polyunsaturated compound. The process includes the step of contacting the composition with a complex of Formula (I) or Formula (XIX) as described above to cause the silyl hydride to react with the polyunsaturated compound such that hydrosilylation occurs selectively at one unsaturated group of the unsaturated compound thereby producing the mono-hydrosilylated product. In connection with this process, the polyunsaturated compound is represented by Formula (VII) or Formula (VIII)

$$E^1[(CH_2)_\beta CR^1=CH_2]_\alpha,$$ (Formula VII)

$$R^2{}_\gamma E^2[(CH_2)_\beta CR^1=CH_2]_\alpha,$$ (Formula VIII)

wherein $E^1$ is a divalent or polyvalent aliphatic or aromatic cyclic hydrocarbon group containing from 3 to 25 carbon atoms, or a divalent or polyvalent aliphatic or aromatic heterocyclic hydrocarbon containing from 3 to 25 carbon atoms, wherein the heteroatom is selected from the group consisting of oxygen, nitrogen, silicon and sulfur;

$E^2$ is a divalent or polyvalent cyclic silicone group containing from 3 to 8 silicon atoms and from 3 to 8 oxygen atoms;

each occurrence of $R^1$ and $R^2$ is independently a hydrogen or a hydrocarbon group containing from 1 to 8 carbon atoms;

each occurrence of $\alpha$, $\beta$ and $\gamma$ is independently an integer, wherein $\alpha$ is 2 to 6; $\beta$ is 0 to 6; and $\gamma$ is 0 to 4.

Advantageously, in connection with the selective mono-hydrosilylation process, the molar ratio of the Si—H functional groups in the silyl hydride to the alkenyl functional groups in the unsaturated compound is between about (0.5/$\alpha$) and about (1.1/$\alpha$).

These and other aspects will become apparent upon reading the following detailed description of the invention.

DETAILED DESCRIPTION OF THE INVENTION

It has been surprisingly found that the complexes according to Formulae (I) and (XIX) are effective at catalyzing hydrosilylations with alkoxy-substituted silanes such as (EtO)$_3$SiH, and sterically hindered silanes such as methylbis(trimethylsilyloxy)silane. Additionally, these complexes were found to give unexpected improvements in selectivity in the mono-hydrosilylations of polyunsaturated substrates such as trivinylcyclohexane over both platinum-based catalysts and FePDI complexes disclosed in US2011/0009573.

The complexes of Formulae (I) and (XIX) have been described above. In connection with these Formulae, G can be Mn, Fe, Ni, or Co. Preferably G is iron or cobalt. More preferably G is Fe (II).

As used herein, "alkyl" includes straight, branched and cyclic alkyl groups. Specific and non-limiting examples of alkyls include, but are not limited to, methyl, ethyl, propyl, and isobutyl. If not otherwise stated, the alkyl group suitable for the present invention is a C1-C18 alkyl, specifically a C1-C10 alkyl, more specifically, a C1-C6 alkyl.

By "substituted alkyl" herein is meant an alkyl group that contains one or more substituent groups that are inert under the process conditions to which the compound containing these substituent groups is subjected. The substituent groups also do not substantially interfere with the hydrosilylation processes described herein. If not otherwise stated, the substituted alkyl group suitable for the present invention is a C1-C18 substituted alkyl, specifically a C1-C10 substituted alkyl, more specifically a C1-C6 substituted alkyl. In one embodiment, the substituent is an inert functional group as defined herein.

By "aryl" herein is meant a non-limiting group of any aromatic hydrocarbon from which one hydrogen atom has been removed. An aryl may have one or more aromatic rings, which may be fused, connected by single bonds or other groups. Specific and non-limiting examples of aryls include, but are not limited to, tolyl, xylyl, phenyl, and naphthyl.

By "substituted aryl" herein is meant an aromatic group that contains one or more substituent groups that are inert under the process conditions to which the compound containing these substituent groups is subjected. The substituent groups also do not substantially interfere with the hydrosilylation processes described herein. Similar to an aryl, a substituted aryl may have one or more aromatic rings, which may be fused, connected by single bonds or other groups; however, when the substituted aryl has a heteroaromatic ring, the free valence in the substituted aryl group can be to a heteroatom (such as nitrogen) of the heteroaromatic ring instead of a carbon. If not otherwise stated, the substituents of the substituted aryl groups herein contain 0 to about 30 carbon atoms, specifically, from 0 to 20 carbon atoms, more specifically, from 0 to 10 carbon atoms. In one embodiment, the substituents are the inert functional groups defined herein.

By "unsaturated" is meant one or more double or triple bonds. Advantageously it refers to carbon-carbon double or triple bonds.

By "inert functional group" herein is meant a group other than alkyl, substituted alkyl, aryl or substituted aryl, which is inert under the process conditions to which the compound containing the group is subjected. The inert functional groups also do not substantially interfere with the hydrosilylation processes described herein. Examples of inert functional groups include halo (fluoro, chloro, bromo, and iodo), ether such as —$OR^{30}$ wherein $R^{30}$ is hydrocarbyl or substituted hydrocarbyl. Advantageously, the inert functional group is a halo group.

"Heteroatom" herein is meant any of the Group 13-17 elements except carbon, and can include for example oxygen, nitrogen, silicon, sulfur, phosphorus, fluorine, chlorine, bromine, and iodine.

In some embodiments, the complexes disclosed herein include those of Formulae (I) and (XIX) having the following substituents: (1) $R_1$ is isopropyl, t-butyl, cyclohexyl, or cyclopentyl; and/or (2) $R_1$ and $R_2$ are both isopropyl, t-butyl, cyclohexyl or cyclopentyl; and/or (3) $R_3$ is methyl in connection with Formula (I) and phenyl in connection with Formula (XIX); and/or (4) $R_4$-$R_9$ are hydrogen; and/or (5) $R_{10}$ is a C1-C10 alkyl or a phenyl group of the following Formula:

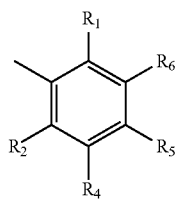

Various methods can be used to prepare complexes of Formulae (I) and (XIX). One method includes reacting a metal-PDI dihalide complex with sodium in the presence of mercury and nitrogen. The metal-PDI dihalide complex can be prepared by reacting a PDI ligand with a metal halide, for example $FeBr_2$. Typically, the PDI ligands are produced through condensation of an appropriate amine or aniline with 2,6-diacetylpyridine and its derivatives. If desired, the PDI ligands can be further modified by known aromatic substitution chemistry. An exemplary method to prepare the complexes of Formulae (I) and (XIX) can be found at Bart, et al., J. Am. Chem. Soc., 2004, 126, 13794, the disclosure of which is incorporated herein by reference in its entirety.

The metal complexes of Formulae (I) and (XIX) are useful for catalyzing industrially practiced hydrosilylation reactions; in particular, (1) the crosslinking of silicone hydride fluids with vinyl terminated polymers for application in release coatings; and (2) hydrosilylation of allyl amines with tertiary silanes for use as adhesion promoters and coupling agents.

When used as catalysts for the hydrosilylation reactions, the complexes of Formulae (I) and (XIX) can be unsupported or supported on a support material, for example, silica, alumina, $MgCl_2$ or zirconia, or on a polymer or prepolymer, for example polyethylene, propylene, polystyrene, or poly(aminostyrene).

In some embodiments, for the purposes of attaching the complexes of Formulae (I) and (XIX) to a support, it is desirable that at least one of $R_7$, $R_8$ and $R_9$ of the metal complexes having structural Formula (I) or (XIX) has a functional group that is effective to covalently bond to the support. Exemplary functional groups include but are not limited to SH, COOH, $NH_2$ or OH groups.

In certain embodiments, silica supported complexes of the invention may be prepared via Ring-Opening Metathesis Polymerization (ROMP) technology as discussed in the literature, for example Macromol. Chem. Phys., 2001, 202, No. 5, 645; Journal of Chromatography A, 1025, 2003, 65, the disclosure of which is incorporated herein by reference in its entirety.

In some embodiments, the complexes of Formulae (I) or (XIX) can be immobilized on the surface of dendrimers by the reaction of Si—Cl bonded parent dendrimers and functionalized complexes of Formulae (I), (XIX) in the presence of a base as illustrated by Kim, et al., in Journal of Organometallic Chemistry 673, 2003, 77.

The hydrosilylation reaction according to the process of the invention can be conducted optionally in the presence of a solvent. Suitable solvents include but are not limited to non-polar, aliphatic and aromatic hydrocarbon solvents. If desired, when the hydrosilylation reaction is completed, the metal complex can be removed from the reaction product by magnetic separation, filtration and/or extraction.

The temperature of the hydrosilylation reaction can be from about −50° C. to about 120° C., specifically from 0° C. to 80° C. and, more specifically, from 10° C. to 60° C. Advantageously, the hydrosilylation reaction is conducted at room temperature, for example from 20° C. to 25° C.

When the complexes of Formula (I) are used as catalysts, suitable silyl hydrides include any compound selected from the group consisting of $R^3_a(R^4O)_b SiH$ (Formula II), $Q_u T_v T^H_p D_w D^H_x M^H_y M_z$ (Formula III), $R_3Si(CH_2)_f(SiR_2O)_e SiR_2H$ (Formula XX), $(RO)_3Si(CH_2)_f(SiR_2O)_e SiR_2H$ (Formula XXI), and combinations thereof. The silyl hydride can contain linear, branched or cyclic structures, or combinations thereof. As used herein, each occurrence of $R^3$, $R^4$, and R is independently C1-C18 alkyl, specifically C1-C10 alkyl, more specifically C1-C6 alkyl, C1-C18 substituted alkyl, specifically C1-C10 substituted alkyl, more specifically C1-C6 substituted alkyl, aryl, and substituted aryl, wherein $R^3$, $R^4$, and R optionally contain at least one heteroatom. The substituent a and b are integers 0 to 3, with the proviso that a+b=3, f has a value of 1 to 8, e has a value of 1 to 11, each of p, u, v, y and z independently has a value from 0 to 20, w and x are from 0 to 1000, provided that p+x+y equals 1 to 3000 and the valences of the all the elements in the silyl hydride are satisfied. Advantageously, f is from 2 to 4, e is from 1 to 3, p, u, v, y, and z are from 0 to 10, w and x are from 0 to 100, wherein p+x+y equals 1 to 100. In one embodiment, a is 0 and b is 3.

As used herein, an "M" group represents a monofunctional group of Formula $R'_3SiO_{1/2}$, a "D" group represents a difunctional group of Formula $R'_2SiO_{2/2}$, a "T" group represents a trifunctional group of Formula $R'SiO_{3/2}$, and a "Q" group represents a tetrafunctional group of Formula $SiO_{4/2}$, an "$M^H$" group represents $H_gR'_{3-g}SiO_{1/2}$, a "$T^H$" represents $HSiO_{3/2}$, and a "$D^H$" group represents $R'HSiO_{2/2}$. As used herein, g is an integer from 0 to 3. Each occurrence of R' is independently C1-C18 alkyl, specifically C1-C10 alkyl, more specifically C1-C6 alkyl, C1-C18 substituted alkyl, specifically C1-C10 substituted alkyl, more specifically C1-C6 substituted alkyl, aryl, and substituted aryl, wherein R' optionally contains at least one heteroatom.

In some embodiments, the silyl hydride has a structure of

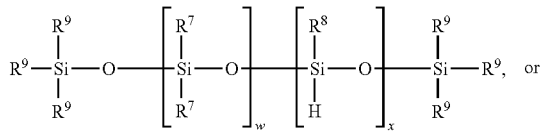
(Formula IV)

or

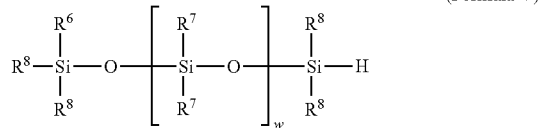
(Formula V)

wherein each occurrence of $R^7$, $R^8$ and $R^9$ is independently a C1-C18 alkyl, C1-C18 substituted alkyl, aryl, or a substituted aryl, $R^6$ is hydrogen, a C1-C18 alkyl, C1-C18 substituted alkyl, aryl, or a substituted aryl, and w and x are independently greater than or equal to 0.

In other embodiments, the suitable silyl hydride is selected from the group consisting of $(CH_3O)_3SiH$, $(C_2H_5O)_3SiH$, $(CH_3)_3SiOSi(CH_3)_2H$, $[(CH_3)_3SiO]_2SiH(CH_3)$, $[(CH_3)_2SiO]_3OSiH(CH_3)$ and $[(CH_3)_2SiO]_4OSiH(CH_3)$.

In connection with the process of using the complex of Formula (I) as the catalyst, the compound containing at least one unsaturated group is selected from the group consisting of an alkyne, a C2-C18 olefin, a cycloalkene, an unsaturated cycloalkane, an unsaturated cycloalkene, an unsaturated cycloalkyl epoxide, an unsaturated alkyl epoxide, a terminally unsaturated amine, an unsaturated aromatic hydrocarbon, an alkyl-capped allyl polyether, an unsaturated aryl ether, a vinyl-functionalized silane, a vinyl-functionalized silicone, a terminally unsaturated acrylate or methyl acrylate, a terminally unsaturated polyurethane polymer, and combinations thereof.

Alkenes suitable for the hydrosilylation reaction are not particularly limited. Advantageously, suitable olefins are C2-C18 alpha olefins such as 1-octene. Exemplary terminally unsaturated amines include allyl amine, and N, N-dimethylallylamine. Exemplary unsaturated cycloalkyl epoxides include limonene oxides, and vinyl cyclohexyl epoxides such as 4-vinyl-1-cyclohexene 1,2-epoxide. Exemplary unsaturated alkyl epoxides include 1,2-epoxy-7-octene, 1,2-epoxy-9-decene, butadiene monoxide, 2-methyl-2-vinyloxirane, 1,2-epoxy-5-hexene, and allyl glycidyl ether. Exemplary unsaturated cycloalkanes include trivinylcyclohexane. Exemplary unsaturated aromatic compounds include styrene.

In some embodiments, the compound containing at least one unsaturated group is selected from the group consisting of $R^3_aSiR^{12}_{4-a}$ (Formula XVII), $Q_uT_vT_p^{vi}D_wD^{vi}_xM^{vi}_yM_z$ (Formula XVIII), and combinations thereof, wherein Q is $SiO_{4/2}$, T is $R'SiO_{3/2}$, $T^{vi}$ is $R^{12}SiO_{3/2}$, D is $R'_2SiO_{2/2}$, $D^{vi}$ is $R'R^{12}SiO_{2/2}$, $M^{vi}$ is $R^{12}_gR'_{3-g}SiO_{1/2}$, M is $R'_3SiO_{1/2}$; $R^{12}$ is vinyl; each occurrence of $R^3$ and R' is independently C1-C18 alkyl, C1-C18 substituted alkyl, aryl, substituted aryl, wherein $R^3$ and R' optionally contain at least one heteroatom; a has a value of from 1 to 3, each g has a value of from 1 to 3, p is from 0 to 20, u is from 0 to 20, v is from 0 to 20, w is from 0 to 5000, x is from 0 to 5000, y is from 0 to 20, and z is from 0 to 20, provided that v+p+w+x+y equals 1 to 10,000, and the valences of all of the elements in the compound containing at least one unsaturated group are satisfied.

In other embodiments, the compound containing at least one unsaturated group is selected from the group consisting of 1-octene, trivinyl cyclohexane, styrene, alkyl-capped allyl polyether, N,N-dimethylallylamine, a vinyl siloxane of the Formula (VI), and combinations thereof, wherein Formula (VI) is

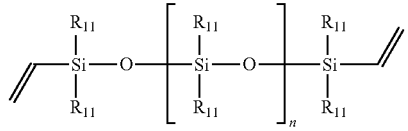
(Formula VI)

wherein each occurrence of $R_{11}$ is independently a C1-C18 alkyl, C1-C18 substituted alkyl, vinyl, aryl, or a substituted aryl, and n is greater than or equal to zero.

In some embodiments, when the silyl hydride is a trialkylsilane having a formula of $R_3SiH$ wherein R is a C1-C18 alkyl, specifically C1-C10 alkyl, more specifically C1-C5 alkyl, the suitable compound containing at least one unsaturated group is a terminally unsaturated amine such as N,N-dimethylallylamine.

When the complex of Formula (XIX) is used as the catalyst for the hydrosilylation reaction, the suitable silyl hydride includes $(R^4O)_3SiH$ (Formula XXII), wherein each occurrence of $R^4$ is independently C1-C18 alkyl, C1-C18 substituted alkyl, aryl, or substituted aryl, and $R^4$ optionally contains at least one heteroatom. The compound containing at least one unsaturated group is selected from the group consisting of a terminally unsaturated amine such as allyl amine, N, N-dimethylallylamine, an unsaturated aromatic hydrocarbon such as styrene, an unsaturated cycloalkane such as trivinylcyclohexane, and combinations thereof.

The metal complexes of Formulae (I) and (XIX) are efficient and selective in catalyzing hydrosilylation reactions. For example, when the compound containing an unsaturated group is a terminally unsaturated amine, the hydrosilylation product is essentially free of internal addition products and isomerization products of the terminally unsaturated amine. As used herein, by "essentially free" is meant no more than 10 wt %, preferably no more than 5 wt % based on the total weight of the hydrosilylation product. "Essentially free of internal addition products" is meant that silicon is added to the terminal carbon of the terminally unsaturated amine.

Accordingly, in some embodiments, the present invention is also directed to the compositions produced from the above described methods. These compositions contain the hydrosilylated products of the silyl hydride and the compound having at least one unsaturated group plus the complex of Formula (I) or (XIX).

In addition to catalyzing the above described hydrosilylation reactions, the complexes of Formula (I) or (XIX) are also effective for mono-hydrosilylation of a polyunsaturated compound. Accordingly, in one embodiment, the present invention is directed to a process for selectively producing a mono-hydrosilylated product from a composition containing a silyl hydride and a polyunsaturated compound. The process includes the step of contacting the composition with a complex of Formula (I) or Formula (XIX) to cause the silyl hydride to react with the polyunsaturated compound such that hydrosilylation occurs selectively at one unsaturated group of the polyunsaturated compound thereby producing the mono-hydrosilylated product. The mono-hydrosilylation product can be subsequently recovered from the reaction mixture, for example, by distillation.

The polyunsaturated compound is represented by Formula (VII) or Formula (VIII)

(Formula VII)

(Formula VIII)

In connection with Formula (VII), $E^1$ is a divalent or polyvalent aliphatic or aromatic cyclic hydrocarbon group containing from 3 to 25 carbon atoms, or a divalent or polyvalent aliphatic or aromatic heterocyclic hydrocarbon group containing from 3 to 25 carbon atoms. Suitable heteroatom includes, but is not limited to oxygen, nitrogen, silicon and sulfur. In one embodiment, $E^1$ contains from 4 to 20 carbon atoms. In another embodiment, $E^1$ contains from 4 to 15 carbon atoms. Exemplary $E^1$ includes aliphatic cyclic hydrocarbons such as cyclohexyl; aromatic cyclic hydrocarbons such as benzene ring; heterocyclic moiety such as a cyanurate, isocyanurate, or triazine ring. Advantageously, $E^1$ is cyclohexyl or a benzene ring.

In connection with Formula (VIII), $E^2$ is a divalent or polyvalent cyclic silicone group containing from 3 to 8 silicon atoms and from 3 to 8 oxygen atoms. Exemplary $E^2$ includes cyclotrisiloxane and cyclotetrasiloxane rings.

In connection with Formula (VII) and Formula (VIII), each occurrence of $R^1$ and $R^2$ is independently hydrogen or a hydrocarbon group containing from 1 to 8 carbon atoms. In one embodiment, $R^1$ is hydrogen or a C1-C4 alkyl group. In another embodiment, $R^2$ is hydrogen, a methyl or ethyl group.

Each occurrence of α, β and γ is independently an integer. α has a value of from 2 to 6, preferably from 3 to 6; β has a value from zero to 6, advantageously from zero to 2; and γ has a value of from 0 to 4.

Advantageously, the polyunsaturated compound is a polyalkenyl compound. Examples of the polyalkenyl compounds are the trivinylcyclohexanes, trivinylbenzenes, tetravinylcyclobutane, trivinyltrimethylcyclotrisiloxane, tetramethyltetravinylcyclotetrasiloxane, triallylcyanurate, and triallylisocyanurate. Trivinylcyclohexanes are preferred.

Suitable silyl hydrides employed in the selective mono-hydrosilylation reactions have been described above in connection with the hydrosilylation process using the complex of Formula (I) as the catalyst. In some embodiments, the silyl hydrides have one of the following structures:

(Formula II)

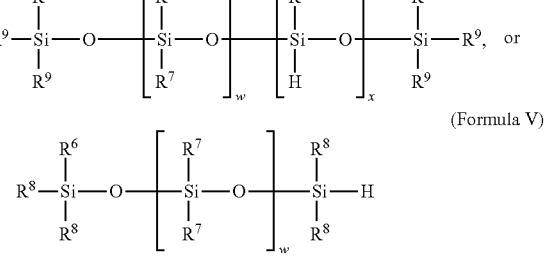
(Formula IV)

(Formula V)

wherein each occurrence of $R^3$, $R^4$, $R^7$, $R^8$, and $R^9$ is independently a C1-C18 alkyl, C1-C18 substituted alkyl, aryl, or substituted aryl, $R^6$ is hydrogen, a C1-C18 alkyl, C1-C18 substituted alkyl, aryl, or substituted aryl, w and x are independently greater than or equal to 0, a and b are integers 0 to 3, with the proviso that a+b=3.

Exemplary silyl hydrides suitable for the selective mono-hydrosilylation process of present invention include, but are not limited to, trialkylsilanes like $(C_2H_5)_3SiH$, trialkoxysilanes like $(CH_3O)_3SiH$ and $(C_2H_5O)_3SiH$, hydridodisiloxanes like $(CH_3)_3SiOSi(CH_3)_2H$, hydridotrisiloxanes like $[(CH_3)_3SiO]_2SiH(CH_3)$, and hydridocyclosiloxanes like $[(CH_3)_2SiO]_3OSiH(CH_3)$ and $[(CH_3)_2SiO]_4OSiH(CH_3)$.

In the composition to be reacted for the formation of the mono-hydrosilylated product, the molar ratio of Si—H functional groups in the silyl hydride to the alkenyl functional groups in the polyunsaturated compound is between about (0.5/α) and about (1.1/α), where α is an integer from 2 to 6. If the ratio is lower than about (0.5/α), the reaction would end up with large quantities of unreacted polyunsaturated compound. If the ratio is greater than about (1.1/α), the reaction would produce excessive bis-hydrosilylation products, thus resulting in reduced selectivity. Advantageously, the ratio is about (1/α). Selective mono-hydrosilylation is favored by slow addition of the silyl hydride to the reaction mixture comprising the polyunsaturated compound and the non-precious metal-based catalyst precursor as described above.

The amount of the catalyst in the reaction mixture calculated based on the non-precious metal catalyst precursor in the total mass of the reaction mixture is 1-10,000 parts per million (ppm), specifically 10-5000 ppm, more specifically 20-2000 ppm.

The temperature of the reaction leading to selective mono-hydrosilylation can be from about −50° C. to about 120° C., specifically from 0° C. to 80° C. and, more specifically, from 10° C. to 60° C. Since the hydrosilylation is exothermic, it might be necessary to apply cooling to control the temperature with narrow limits, depending on the particular polyunsaturated compound and silyl hydride used.

Solvents aid in the dissolution of the catalysts as well as in the control of reaction rate. Hydrocarbon solvents such as toluene and pentane are suitable. Selective mono-hydrosilylation is favored by dissolving the silyl hydride in the solvent and adding the solution slowly to the reaction mixture comprising the polyunsaturated compound and the catalyst of the invention. An effective rate of addition is that which minimizes both the reaction exotherm and the extent of bis-hydrosilylation.

In another embodiment, the present invention is directed to the composition produced from the selective mono-hydrosilylation process described above. In the composition, the ratio of the mono-hydrosilylated product to the bis-hydrosilylated product is greater than about 1.8, specifically greater than about 3, more specifically greater than about 4. The composition also contains the complex of Formulae (I) or (XIX).

Another preferred embodiment is the composition produced by the hydrosilylation of trivinylcyclohexane. The composition contains a monosilylated divinylcyclohexane product having one of the following general Formulae:

$(H_2C=CH)_2C_6H_9CH_2CH_2—Si(OR)_3$     FORMULA IX $(H_2C=CH)_2C_6H_9CH_2CH_2—SiR_3$     FORMULA X $(H_2C=CH)_2C_6H_9CH_2CH_2—Y$     FORMULA XI

In Formulae IX and X, R represents branched or straight-chained C1-C20 alkyl, C3-C20 cycloaliphatic or aromatic groups. The groups are not necessarily all the same in a single molecule. Thus, in Formula X, one R group can be octyl, another methyl and the third tert-butyl. R is methyl, ethyl or isopropyl in the preferred compounds of Formula IX and Formula X.

In Formula XI, Y is a univalent siloxanyl radical of general Formulae (XII), (XIII) or (XIV) in which R represents branched or straight-chained C1-C20 alkyl, C3-C20 cycloaliphatic or aromatic groups, and x is greater than or equal to zero.

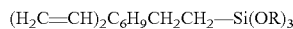
R$_3$SiO(SiR$_2$O)$_x$(RSiO)SiR$_3$     FORMULA XII

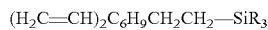
R$_3$SiO(SiR$_2$O)$_x$SiR$_2$—     FORMULA XIII

(R$_2$SiO)$_x$OSiR     FORMULA XIV

Examples of mono-hydrosilylated compounds of Formula XI are $(H_2C=CH)_2C_6H_9CH_2CH_2—Si[OSi(CH_3)_3]_2CH_3$ $(H_2C=CH)_2C_6H_9CH_2CH_2—Si(CH_3)_2—O—Si(CH_3)_2CH_2CH_2Si(CH_3)_3.$ Commercial trivinylcyclohexane occurs primarily as mixtures of stereoisomers with vinyl groups at the 1, 2 and 4 positions. However, stereoisomers with 1, 2, 3- and 1, 3, 5-vinyl substitution are also known. The following specifications are based on the 1, 2, 4-isomeric mixture, but they are also generally applicable to the other two trisubstituted isomeric mixtures.

In the 1, 2, 4-trivinylcyclohexane stereoisomers, the differences are in the orientation of the vinyl groups relative to each other (cis versus trans), and relative to the cyclohexane ring (equatorial versus axial). This results in a total of eight stereoisomers, which occur as four mirror-image pairs of enantiomers. These four pairs, each being diastereomers of each other, can be separated from each other in the mixture by careful distillation. No separation by distillation occurs between the enantiomers of each pair. Thus, four compositions can be obtained, each being a racemic mixture of two mirror-image enantiomers. These four compositions will be referred to herein as Isomer A, Isomer B, Isomer C, and Isomer D, respectively. Their designations as A, B, C, or D are based on the order in which they are collected using a multiplate distillation column, A being the first, and D the last. The structures of Isomers A, B, C and D are shown below:

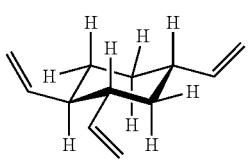
A

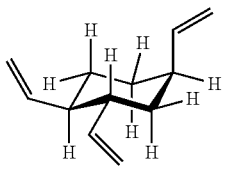
B

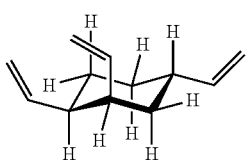
C

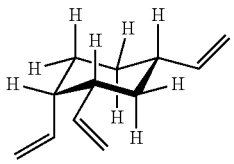
D

Four Isomeric Forms (A, B, C & D) of 1, 2, 4-Trivinylcyclohexane

When hydrosilylation of the undistilled mixture of trivinylcyclohexane stereoisomers, or of the individual distillation fractions labeled Isomer A and B is catalyzed with the catalysts of the invention, the initial addition of the silyl group occurs preferentially at the 4 position of the cyclohexane ring. This preference is significantly higher for the stereoisomers in the A fraction. Accordingly, not only is selective mono-hydrosilylation realized, but also regioselective mono-hydrosilylation at the 4 position. In contrast, platinum-catalyzed hydrosilylation of trivinylcyclohexane results in random addition of the silyl functionality to the vinyl groups with no particular preference for the 1, 2 or 4 position.

The catalyst of the present invention, for example, the complex of Formula (I), or Formula (XIX) allows the selective synthesis of 1,2-divinyl,4-(2-triethoxysilyl-ethyl)cyclohexane in at least 65 weight percent yield, preferably in at least 75 weight percent yield, from Isomer A and triethoxysilane. The gravimetric ratio of mono-hydrosilylated product to the bis-hydrosilylated product is greater than 2, preferably greater than 4 and most preferably greater than 6. 1,2-divinyl,4-(2-triethoxysilylethyl)cyclohexane is a key intermediate in the synthesis of sulfur silanes useful for improving rolling resistance and wear in automobile tires.

Accordingly, the present invention provides a useful way to selectively prepare this important intermediate.

Accordingly, in one embodiment, the present invention relates to a process for selectively producing a mono-hydrosilylated product from a reaction mixture containing a silyl hydride and 1,2,4-trivinylcyclohexane. The process includes the step of reacting the trivinylcyclohexane with the silyl hydride in the presence of a complex of Formula (I) or Formula (XIX), wherein the molar ratio of the Si—H functional groups in the silyl hydride to the alkenyl functional groups in the 1,2,4-trivinylcyclohexane is between about (0.5/3) and about (1.1/3); and wherein the silyl group from the silyl hydride is selectively added to the 4 position of the 1,2,4-trivinylcyclohexane.

In connection with the process, the silyl hydride can be triethoxysilane. The trivinylcyclohexane can be a mixture of trivinylcyclohexane stereoisomers or trivinylcyclohexane isomer A and/or trivinylcyclohexane isomer B.

The following examples are intended to illustrate, but in no way limit the scope of the present invention. All parts and percentages are by weight and all temperatures are in degrees Celsius unless explicitly stated otherwise.

EXAMPLES

General Considerations:

All air- and moisture-sensitive manipulations were carried out using standard vacuum line, Schlenk and cannula techniques or in an MBraun inert atmosphere drybox containing an atmosphere of purified nitrogen. Benzene-$d_6$ was purchased from Cambridge Isotope Laboratories and distilled from sodium metal under an atmosphere of argon and stored over 4 Å molecular sieves. CDCl$_3$ was purchased from Cambridge Isotope Laboratories and used as received or distilled from calcium hydride. The complexes ($^{iPr}$PDI)Fe(N$_2$)$_2$ and ($^{iPr}$BPDI)Fe(N$_2$)$_2$, which structures are shown below, were prepared according to: Bart, et al., J. Am. Chem. Soc., 2004, 126, 13794. Methylbis(trimethylsilyloxy)silane (MD$^H$M), triethoxysilane, triethylsilane, 1-octene, styrene, N,N-dimethylallylamine and trivinylcyclohexane were dried and distilled from calcium hydride prior to use, M$^{vi}$D$_{120}$M$^{vi}$ (SilForce® SL6100, M$^{vi}$: dimethylvinylsiloxy; D: dimethylsiloxy) and MD$_{15}$D$^H_{30}$M (SilForce® SL6020, M: trimethylsiloxy; D: dimethylsiloxy; D$^H$: methylhydridosiloxy) were dried under vacuum for 12 hours.

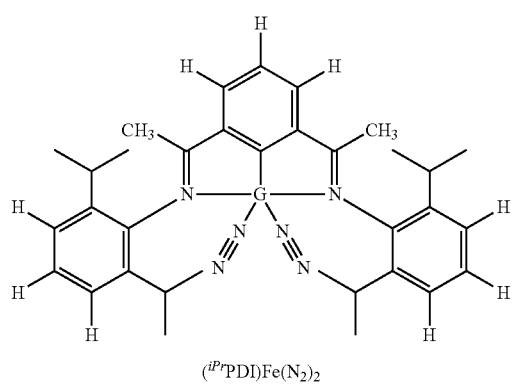

($^{iPr}$PDI)Fe(N$_2$)$_2$

-continued

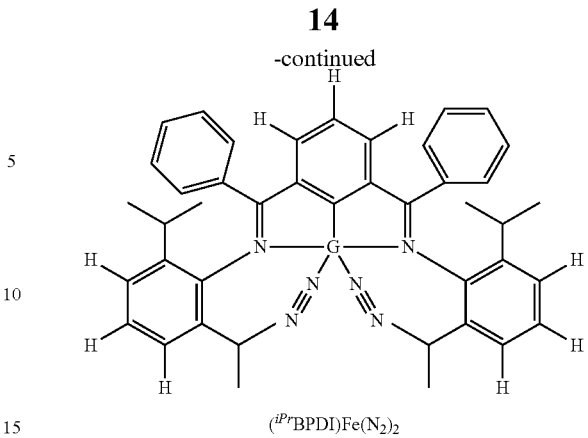

($^{iPr}$BPDI)Fe(N$_2$)$_2$ $^1$H NMR spectra were recorded on Varian Inova 400 and 500 spectrometers operating at 399.780 and 500.62 MHz, respectively. All chemical shifts are reported relative to SiMe$_4$ using $^1$H (residual) chemical shifts of the solvent as a secondary standard.

GC analyses were performed using a Shimadzu GC-2010 gas chromatograph equipped with a Shimadzu AOC-20s autosampler and a Shimadzu SHRXI-5MS capillary column (15 m×250 μm). The instrument was set to an injection volume of 1 μL, an inlet split ratio of 100:1, and inlet and detector temperatures of 120° C. and 250° C., respectively. UHP-grade helium was used as carrier gas with a flow rate of 1.12 mL/min. The temperature program used for all the analyses is as follows: 80° C., 1 min; 20° C./min to 240° C., 4 min.

All the hydrosilylation reactions were conducted at 23° C. unless otherwise noted.

Example 1 Hydrosilylation of 1-Octene with Methylbis(Trimethylsilyloxy)Silane (MD$^H$M) Using ($^{iPr}$PDI)Fe(N$_2$)$_2$ In a nitrogen-filled drybox, a 20 mL scintillation vial was charged with 335 mg (2.99 mmol) of 1-octene and 665 mg (2.99 mmol) of MD$^H$M. The solution was stirred and 1 mg (0.002 mmol, 1×10$^3$ ppm catalyst loading) of ($^{iPr}$PDI)Fe(N$_2$)$_2$ was added. After 15 minutes, the reaction was quenched by exposure to air. GC analysis of the product showed 99% conversion of 1-octene (retention time=1.33 min) to the hydrosilylated product (retention time=5.85 min). NMR analysis of the sample in benzene-d6 showed a signature peak for the α-hydrogens at 0.62 ppm.

Example 2 Hydrosilylation of 1-Octene with Triethoxysilane Using ($^{iPr}$PDI)Fe(N$_2$)$_2$ In a nitrogen-filled drybox, a 20 mL scintillation vial was charged with 245 mg (2.18 mmol) of 1-octene and 360 mg (2.19 mmol) of triethoxysilane. The solution was stirred and 1 mg (0.002 mmol, 2×10$^3$ ppm catalyst loading) of ($^{iPr}$PDI)Fe(N$_2$)$_2$ was added. After 15 minutes, the reaction was quenched by exposure to air. GC analysis of the product showed 99% conversion of 1-octene (retention time=1.33 min) to the hydrosilylated product (retention time=5.97 min).

Example 3 Hydrosilylation of 1-Octene with Triethylsilane Using ($^{iPr}$PDI)Fe(N$_2$)$_2$ In a nitrogen-filled drybox, a 20 mL scintillation vial was charged with 290 mg (2.58 mmol) of 1-octene and 310 mg (2.67 mmol) of triethylsilane. The solution was stirred and 1 mg (0.002 mmol, 2×10$^3$ ppm catalyst loading) of ($^{iPr}$PDI)Fe(N$_2$)$_2$ was added. After 60 minutes, the reaction was quenched by exposure to air. GC analysis of the product showed 4% conversion of 1-octene (retention time=1.33 min) to the hydrosilylated product (retention time=5.88 min).

Example 4 Hydrosilylation of Styrene with Methylbis(Trimethylsilyloxy)Silane (MD$^H$M) Using ($^{iPr}$PDI)Fe(N$_2$)$_2$ In a nitrogen-filled drybox, a 20 mL scintillation vial was charged with 190 mg (1.83 mmol) of styrene and 410 mg (1.84 mmol) of MD$^H$M. The solution was stirred and 1 mg (0.002 mmol, 2×10$^3$ ppm catalyst loading) of ($^{iPr}$PDI)Fe(N$_2$)$_2$ was added. After 60 minutes, the reaction was quenched by exposure to air. GC analysis of the product showed 3% conversion of styrene (retention time=1.84 min) to the hydrosilylated product (retention time=6.35 min).

Example 5 Hydrosilylation of N,N-Dimethylallylamine with Methylbis(Trimethylsilyloxy)Silane (MD$^H$M) Using ($^{iPr}$PDI)Fe(N$_2$)$_2$ In a nitrogen-filled drybox, a 20 mL scintillation vial was charged with 165 mg (1.94 mmol) of N,N-dimethylallylamine and 435 mg (1.96 mmol) of MD$^H$M. The solution was stirred and 1 mg (0.002 mmol, 2×10$^3$ ppm catalyst loading) of ($^{iPr}$PDI)Fe(N$_2$)$_2$ was added. After 60 minutes, the reaction was quenched by exposure to air. NMR analysis of the product showed 93% conversion of N,N-dimethylallylamine to the hydrosilylated product ($\delta_{\alpha-H}$=0.63 ppm).

Example 6 Hydrosilylation of N,N-Dimethylallylamine (DMAA) with Methylbis(Trimethylsilyloxy)Silane (MD$^H$M) Using ($^{iPr}$PDI)Fe(N$_2$)$_2$ In a nitrogen-filled drybox, a 20 mL scintillation vial was charged with 0.040 g (0.47 mmol) of DMAA and 0.104 g (0.47 mmol) of MD$^H$M. The solution was stirred and 0.003 g (0.005 mmol, 1 mol % catalyst loading) of ($^{iPr}$PDI)Fe(N$_2$)$_2$ was added. After 60 minutes, the reaction was quenched by exposure to air. NMR analysis of the product showed 93% conversion of N,N-dimethylallylamine to the hydrosilylated product.

Example 7 Hydrosilylation of N,N-Dimethylallylamine (DMAA) with Triethoxysilane Using ($^{iPr}$PDI)Fe(N$_2$)$_2$ This reaction was carried out in a manner similar to the hydrosilylation of DMAA with MD$^H$M as shown in Example 6 using 0.040 g (0.47 mmol) of DMAA, 0.077 g (0.047 mmol) of triethoxysilane and 0.003 g (0.005 mmol) of ($^{iPr}$PDI)Fe(N$_2$)$_2$. After 60 minutes, the reaction was quenched by exposure to air. NMR analysis of the product showed >95% conversion of N,N-dimethylallylamine to the hydrosilylated product.

Example 8 Hydrosilylation of N,N-Dimethylallylamine (DMAA) with Triethylsilane Using ($^{iPr}$PDI)Fe(N$_2$)$_2$ This reaction was carried out in a manner similar to the hydrosilylation of DMAA with MD$^H$M as shown in Example 6 using 0.040 g (0.47 mmol) of DMAA, 0.055 g (0.047 mmol) of triethylsilane and 0.003 g (0.005 mmol) of ($^{iPr}$PDI)Fe(N$_2$)$_2$. After 60 minutes, the reaction was quenched by exposure to air. NMR analysis of the product showed approximately 38% conversion of N,N-dimethylallylamine to the hydrosilylated product 8% conversion to N,N-dimethyl-1-propenylamine.

Example 9 Hydrosilylation of Styrene with Triethoxysilane Using ($^{iPr}$PDI)Fe(N$_2$)$_2$ In a nitrogen-filled drybox, a 20 mL scintillation vial was charged with 45 mg (0.43 mmol) of styrene and 71 mg (0.43 mmol) of triethoxysilane. The solution was stirred and 2 mg (0.004 mmol, 1 mol %) of ($^{iPr}$PDI)Fe(N$_2$)$_2$ was added. After 60 minutes, the reaction was quenched by exposure to air. NMR analysis of the product showed >95% conversion of styrene to the hydrosilylated product.

Example 10 Hydrosilylation of Trivinylcyclohexane (Isomer A) with Triethylsilane Using ($^{iPr}$PDI)Fe(N$_2$)$_2$ In a nitrogen-filled drybox, a 20 mL scintillation vial was charged with 349 mg (2.15 mmol) of trivinylcyclohexane and 251 mg (2.16 mmol) of triethylsilane. The solution was stirred and 1 mg (0.002 mmol, 2×10$^3$ ppm catalyst loading) of ($^{iPr}$PDI)Fe(N$_2$)$_2$ was added. After 60 minutes, the reaction was quenched by exposure to air. GC analysis of the product showed 3.5% conversion of trivinylcyclohexane to the hydrosilylated products, 3.2% of which is the monosilylated product. The C$_4$-vinyl hydrosilylated product (retention time=7.89 min) comprised 87% of the monosilylated product.

Example 11 Hydrosilylation of Trivinylcyclohexane (Isomer A) with Methylbis(Trimethylsilyloxy)Silane (MD$^H$M) Using ($^{iPr}$PDI)Fe(N$_2$)$_2$ In a nitrogen-filled drybox, a 20 mL scintillation vial was charged with 253 mg (1.56 mmol) of trivinylcyclohexane and 347 mg (1.56 mmol) of MD$^H$M. 1 mg (0.002 mmol, 2×10$^3$ ppm catalyst loading) of ($^{iPr}$PDI)Fe(N$_2$)$_2$ was then added to the reaction mixture. After stirring for 60 minutes, the reaction was quenched by exposure to air. GC analysis of the product showed 52% conversion of trivinylcyclohexane to the hydrosilylated products, 95% of which is the monosilylated product. The C$_4$-vinyl hydrosilylated product (retention time=7.61 min) comprised 95% of the monosilylated product.

Example 12 Hydrosilylation of Trivinylcyclohexane (Isomer A) with Triethoxysilane Using ($^{iPr}$PDI)Fe(N$_2$)$_2$ This reaction was carried out in a manner similar to the hydrosilylation with MD$^H$M as shown in Example 4. 298 mg (1.84 mmol) of trivinylcyclohexane, 302 mg (1.84 mmol) of triethoxysilane and 1 mg (0.002 mmol, 2×10$^3$ ppm catalyst loading) of ($^{iPr}$PDI)Fe(N$_2$)$_2$ were used. GC analysis of the product showed 90% conversion of trivinylcyclohexane to the hydrosilylated products, 82% of which is the monosilylated product. The C$_4$-vinyl hydrosilylated product (retention time=7.80 min) comprised 94% of the monosilylated product. The gravimetric ratio of mono hydrosilylated product to the bis hydrosilylated product was >8.

Comparative Example A Mono-Hydrosilylation of TVCH Isomer A with Triethoxysilane (TES) Using [($^{2,6\text{-}Et2}$PDI)Fe(N$_2$)]$_2$[μ-(N$_2$)]

The 1,2,4-trivinylcyclohexane sample used in this experiment contained 98.4% Isomer A and 1.6% Isomer B. TES was prepared by the Direct Process disclosed in U.S. Pat. No. 7,429,672. [($^{2,6\text{-}Et2}$PDI)Fe(N$_2$)]$_2$[μ-(N$_2$)] was prepared using the procedure disclosed at Example 3 of US Patent Application Publication No. 2011/0009573.

In an inert atmosphere at 23° C., a scintillation vial was charged with 0.150 g (0.92 mmol) of 1,2,4-trivinylcyclohexane and 0.150 g (0.92 mmol) of TES. The SiH/Vinyl molar ratio was (1/3). To the stirring solution was added 0.002 g (0.002 mmol) of [($^{2,6\text{-}Et2}$PDI)Fe(N$_2$)]$_2$[μ-(N$_2$)] (0.5 mol % catalyst to silane). An exotherm occurred. The reaction was stirred for about 60 minutes and then quenched in air. Analysis of the reaction mixture by GC and GC/MS provided evidence that TES was completely consumed and that the mono and bis-hydrosilylation products were present in 60.2% and 24.4%, respectively. The gravimetric ratio was 2.46.

Proton NMR analysis revealed that mono-hydrosilylation had occurred with 90% regioselectivity at the vinyl group at position 4 of the cyclohexane ring.

Comparative Example B Comparative Experiment with Karstedt's Pt Catalyst (2-Triethoxysilylethyl)divinylcyclohexane was prepared from triethoxysilane and 1,2,4-trivinylcyclohexane using the procedure disclosed in Example 1 of U.S. Pat. No. 7,696,269 for trimethoxysilane and 1,2,4-trivinylcyclohexane. A 5 liter, three-neck round bottomed flask fitted with a heating mantle, mechanical stirrer, addition funnel, Friedrich condenser, nitrogen inlet and thermocouple/temperature controller was charged with 1800 g TVCH (11.1 moles) and 3.6 g of a solution (1 wt % Pt) of Karstedt's platinum catalyst in xylene. The contents of the flask were stirred and heated to 90° C. Triethoxysilane (1641 g, 9.99 moles), which had been placed in the addition funnel, was then added slowly over a four hour period to control the exotherm. The temperature remained between 101-109° C. during the addition. The SiH/Vinyl molar ratio in the reaction was 0.3. GC analysis of the crude reaction product gave 21 wt % unreacted TVCH, 48 wt % mono-hydrosilylated product, ((2-triethoxysilylethyl)divinylcyclohexane), 26.3 wt % bis and 2.7 wt % tris hydrosilylated trivinylcyclohexane. The gravimetric ratio of mono to bis was 1.82.

GC of the reaction product from this platinum catalyzed trivinylcyclohexane hydrosilylation showed three closely-spaced peaks of near equal intensity eluting with retention times corresponding to the mono-hydrosilylated product. This is in contrast to the reaction products obtained with the non-precious metal-based pyridinediimine catalysts of the present invention. When the catalysts of the present invention are used, typically, one peak, corresponding to the regioisomer with silylation of the vinyl group at position 4 of the cyclohexane ring, dominates this retention time portion of the gas chromatogram. Accordingly, it can be concluded that platinum catalysis allows hydrosilylation of the three vinyl groups with near equal probability. Thus, platinum catalysis does not confer the regioselectivity realized with the non-precious metal pyridinediimine catalysts of the present invention.

Example 13 Crosslinking of M$^{vi}$D$_{120}$M$^{vi}$ (SilForce® SL6100) and MD$_{15}$D'$_{30}$M (SilForce® SL6020) Using ($^{iPr}$PDI)Fe(N$_2$)$_2$ In a nitrogen-filled drybox, a 20 mL scintillation vial was charged with 1.0 g of SilForce® SL6100 and 44 mg SilForce® SL6020. A stock solution of 1 mg ($^{iPr}$PDI)Fe(N$_2$)$_2$ in 200 mg toluene was prepared and added dropwise to a stirring solution of the polymers. Immediate gelation of the polymers was observed and a hard gel was obtained at the end of the addition of the catalyst. The product was indistinguishable from that obtained using Karstedt's catalyst.

Example 14 Hydrosilylation of Styrene with Triethoxysilane Using ($^{iPr}$BPDI)Fe(N$_2$)$_2$ In a nitrogen-filled drybox, a 20 mL scintillation vial was charged with 45 mg (0.43 mmol) of styrene and 71 mg (0.43 mmol) of triethoxysilane. The solution was stirred and 3 mg (0.004 mmol, 30×10$^3$ ppm catalyst loading) of ($^{iPr}$BPDI)Fe(N$_2$)$_2$ was added. After 60 minutes, the reaction was quenched by exposure to air. NMR analysis of the product showed 30% conversion of styrene to the hydrosilylated product.

Example 15 Hydrosilylation of N,N-Dimethylallylamine (DMAA) with Triethoxysilane Using ($^{iPr}$BPDI)Fe(N$_2$)$_2$ This reaction was carried out in a manner similar to the hydrosilylation of styrene with triethoxysilane. 35 mg (0.41 mmol) of DMAA, 68 mg (0.41 mmol) of triethoxysilane and 3 mg (0.004 mmol, 30×10$^3$ ppm catalyst loading) of ($^{iPr}$BPDI)Fe(N$_2$)$_2$ were used. NMR analysis of the product showed >95% conversion of DMAA to the hydrosilylated product.

Example 16 Hydrosilylation of Trivinylcyclohexane (Isomer A) with Triethoxysilane Using ($^{iPr}$BPDI)Fe(N$_2$)$_2$ In a nitrogen-filled drybox, a 20 mL scintillation vial was charged with 100 mg (0.616 mmol) of trivinylcyclohexane and 102 mg (0.621 mmol) of triethoxysilane. 2 mg (0.003 mmol, 10×10$^3$ ppm catalyst loading) of ($^{iPr}$BPDI)Fe(N$_2$)$_2$ was then added to the reaction mixture. After stirring for 60 minutes, the reaction was quenched by exposure to air. GC analysis of the product showed 85% conversion of trivinylcyclohexane to the hydrosilylated products, 95% of which is the monosilylated product. The C$_4$-vinyl hydrosilylated product (retention time=7.61 min) comprised 94% of the monosilylated product.

While the above description contains many specifics, these specifics should not be construed as limitations on the scope of the invention, but merely as exemplifications of preferred embodiments thereof. Those skilled in the art will envision many other possible variations that are within the scope and spirit of the invention as defined by the claims appended hereto.

What is claimed is:

1. A process for selectively producing a mono-hydrosilylated product from a composition containing a tertiary silyl hydride and a polyunsaturated compound comprising contacting the composition with a complex of Formula (I) or Formula (XIX) to cause the silyl hydride to react with the polyunsaturated compound such that hydrosilylation occurs selectively at one unsaturated group of the unsaturated compound thereby producing the mono-hydrosilylated product, wherein Formula (I) and Formula (XIX) are:

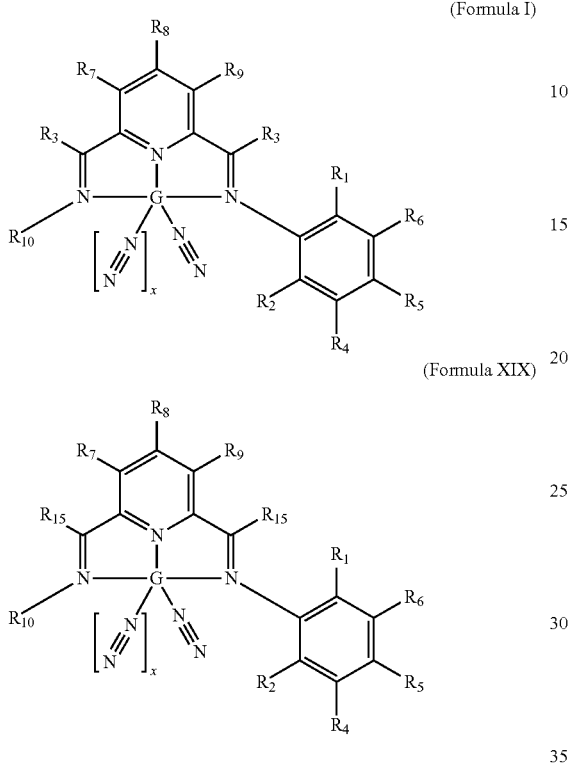

(Formula I)

(Formula XIX)

wherein:
G is Mn, Fe, Ni, or Co;
x is 0 or 1;
each occurrence of $R_1$, $R_2$, $R_4$, $R_5$, $R_6$, $R_7$, $R_8$ and $R_9$ is independently H, C1-18 alkyl, C1-C18 substituted alkyl, aryl, substituted aryl, or an inert functional group;
each occurrence of $R_3$ is independently H, C1-C18 alkyl, C1-C18 substituted alkyl, or an inert functional group, wherein $R_1$ to $R_9$, other than hydrogen, optionally contain at least one heteroatom;
each occurrence of $R_{10}$ is C1-C18 alkyl, C1-C18 substituted alkyl, aryl or substituted aryl group, wherein $R_{10}$ optionally contains at least one heteroatom;
each occurrence of $R_{15}$ is aryl or substituted aryl;
optionally any two of $R_1$, $R_2$, $R_3$, $R_4$, $R_5$, $R_6$, $R_7$, $R_8$, $R_9$ and $R_{10}$ vicinal to one another taken together may form a ring being a substituted or unsubstituted, saturated, or unsaturated cyclic structure;
wherein the polyunsaturated compound is represented by Formula (VII) or Formula (VIII)

(Formula VII)

(Formula VIII)

wherein
$E^1$ is a divalent or polyvalent aliphatic cyclic hydrocarbon group or aromatic cyclic hydrocarbon group containing from 3 to 25 carbon atoms, or a divalent or polyvalent aliphatic heterocyclic hydrocarbon or aromatic heterocyclic hydrocarbon containing from 3 to 25 carbon atoms, wherein the heteroatom is selected from the group consisting of oxygen, nitrogen, silicon and sulfur;
$E^2$ is a divalent or polyvalent cyclic silicone group containing from 3 to 8 silicon atoms and from 3 to 8 oxygen atoms;
each occurrence of $R^1$ and $R^2$ is independently a hydrogen or a hydrocarbon group containing from 1 to 8 carbon atoms;
each occurrence of α, β and γ is independently an integer, wherein α is 2 to 6; β is 0 to 6; and γ is 0 to 4;
wherein the molar ratio of the Si-H functional groups in the silyl hydride to the alkenyl functional groups in the unsaturated compound is between about (0.5/α) and about (1.1/α); and the tertiary silyl hydride is selected from Formula II, Formula IV, Formula V, or a combination thereof

(Formula II)

(Formula IV)

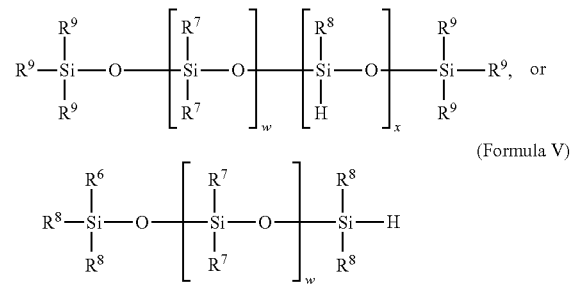

(Formula V)

wherein $R^3$, $R^4$, $R^7$, $R^8$, and $R^9$ is each independently a C1-C18 alkyl, C1-C18 substituted alkyl, aryl, or substituted aryl, $R^6$ is hydrogen, a C1-C18 alkyl, C1-C18 substituted alkyl, aryl, or substituted aryl, x and w are independently greater than or equal to 0, a and b are integers 0 to 3, with the proviso that a+b=3, and x is greater than or equal to 0.

2. The process of claim 1 wherein the molar ratio of the Si-H functional groups in the silyl hydride to the alkenyl functional groups in the unsaturated compound is about 1/α.

3. The process of claim 1 wherein the unsaturated compound is selected from the group consisting of trivinyl cyclohexanes, tetravinylcyclobutane, trivinyltrimethylcyclotrisiloxane, tetramethyltetravinylcyclotetrasiloxane, triallylcyanurate, and triallylisocyanurate.

4. The process of claim 1 wherein the unsaturated compound is trivinylcyclohexane.

5. The process of claim 1 wherein the silyl hydride is selected from the group consisting of $(CH_3O)_3SiH$, $(C_2H_5O)_3SiH$, $(CH_3)_3SiOSi(CH_3)_2H$, $[(CH_3)_3SiO]_2SiH(CH_3)$, $[(CH_3)_2SiO]_3OSiH(CH_3)$ and $[(CH_3)_2SiO]_4OSiH(CH_3)$.

6. The process of claim 1 wherein each occurrence of $R_{10}$ is independently

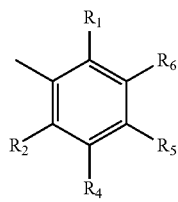

wherein $R_1$, $R_2$, $R_4$, $R_5$, and $R_6$ are as defined in claim 1.

7. The process of claim 1 wherein the complex is immobilized on a support.

8. The process of claim 1, wherein the silylhydride is of the formula

  (Formula II).

9. A process for selectively producing a mono-hydrosilylated product from 1,2,4-trivinylcyclohexane and a tertiary silyl hydride comprising reacting the trivinylcyclohexane with the silyl hydride in the presence of a complex of Formula (I) or Formula (XIX), wherein Formula (I) and Formula (XIX) are:

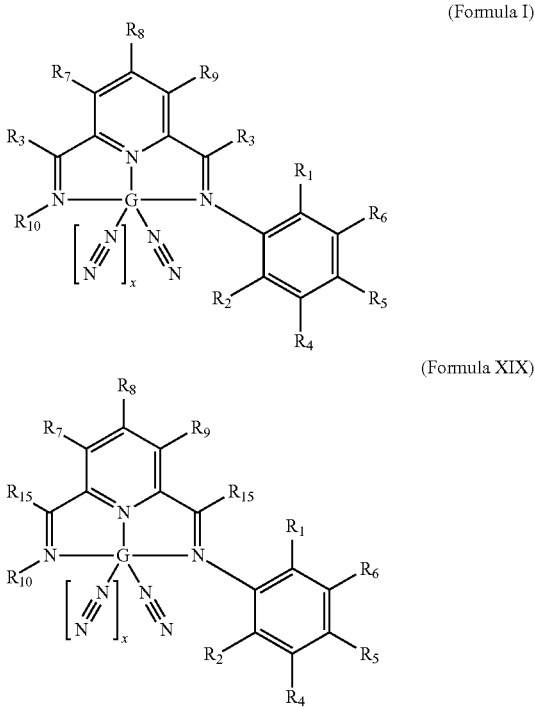

wherein:
G is Mn, Fe, Ni, or Co;
x is 0 or 1;
each occurrence of $R_1$, $R_2$, $R_4$, $R_5$, $R_6$, $R_7$, $R_8$ and $R_9$ is independently H, C1-18 alkyl, C1-C18 substituted alkyl, aryl, substituted aryl, or an inert functional group;
each occurrence of $R_3$ is independently H, C1-C18 alkyl, C1-C18 substituted alkyl, or an inert functional group, wherein $R_1$ to $R_9$, other than hydrogen, optionally contain at least one heteroatom;
each occurrence of $R_{10}$ is C1-C18 alkyl, C1-C18 substituted alkyl, aryl or substituted aryl group, wherein $R_{10}$ optionally contains at least one heteroatom;
each occurrence of $R_{15}$ is aryl or substituted aryl;
optionally any two of $R_1$, $R_2$, $R_3$, $R_4$, $R_5$, $R_6$, $R_7$, $R_8$, $R_9$ and $R_{10}$ vicinal to one another taken together may form a ring being a substituted or unsubstituted, saturated, or unsaturated cyclic structure;
wherein the molar ratio of the Si-H functional groups in the silyl hydride to the alkenyl functional groups in the 1,2,4-trivinylcyclohexane is between about (0.5/3) and about (1.1/3);

wherein the silyl group from the silyl hydride is selectively added to the 4 position of the 1,2,4-trivinylcyclohexane; and the tertiary silyl hydride is selected from Formula II, Formula IV, Formula V, or a combination thereof

  (Formula II),

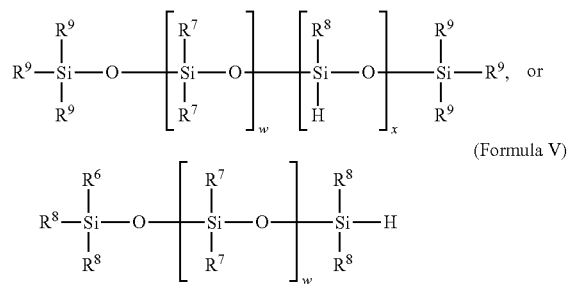

wherein $R^3$, $R^4$, $R^7$, $R^8$, and $R^9$ is each independently a C1-C18 alkyl, C1-C18 substituted alkyl, aryl, or substituted aryl, $R^6$ is hydrogen, a C1-C18 alkyl, C1-C18 substituted alkyl, aryl, or substituted aryl, x and w are independently greater than or equal to 0, a and b are integers 0 to 3, with the proviso that a+b=3, and x is greater than or equal to 0.

10. The process of claim 9 wherein the silyl hydride is triethoxysilane.

11. The process of claim 9 wherein the silyl hydride is bis(trimethylsiloxy)methylsilane.

12. The process of claim 9 wherein the trivinylcyclohexane is a mixture of trivinylcyclohexane stereoisomers.

13. The process of claim 9 wherein the trivinylcyclohexane is trivinylcyclohexane isomer A and/or trivinylcyclohexane isomer B, wherein isomer A and isomer B have structure Formulae (XV) and (XVI):

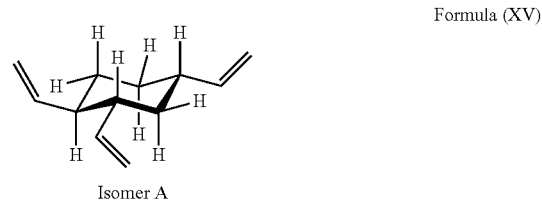

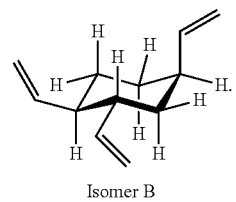

14. A process for the hydrosilylation of a composition containing a silyl hydride and a compound containing at least one unsaturated group, the process comprising: (i) contacting the composition with a complex of Formula (XIX), optionally in the presence of a solvent, to cause the silyl hydride to react with the compound containing at least one unsaturated group to produce a hydrosilylation product containing said complex, and (ii) optionally removing the complex from the hydrosilylation product,
wherein the complex of Formula (XIX) is:

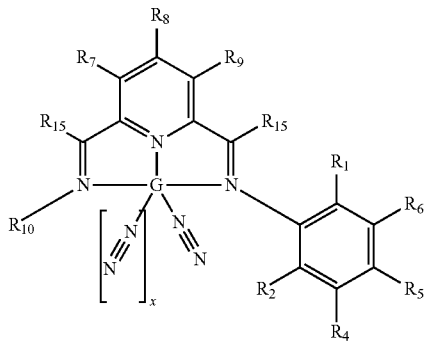

(Formula XIX)

wherein:
G is Mn, Fe, Ni, or Co;
x is 0 or 1;
each occurrence of $R_1$, $R_2$, $R_4$, $R_5$, $R_6$, $R_7$, $R_8$ and $R_9$ is independently H, C1-18 alkyl, C1-C18 substituted alkyl, aryl, substituted aryl, or an inert functional group;
each occurrence of $R_{15}$ is aryl or substituted aryl;
$R_1$, $R_2$, $R_4$, $R_5$, $R_6$, $R_7$, $R_8$, $R_9$, and $R_{15}$, other than hydrogen, optionally contain at least one heteroatom;
each occurrence of $R_{10}$ is C1-C18 alkyl, C1-C18 substituted alkyl, aryl or substituted aryl group, wherein $R_{10}$ optionally contains at least one heteroatom;
optionally any two of $R_1$, $R_2$, $R_{15}$, $R_4$, $R_5$, $R_6$, $R_7$, $R_8$, $R_9$ and $R_{10}$ vicinal to one another taken together may form a ring being a substituted or unsubstituted, saturated, or unsaturated cyclic structure;
wherein the silyl hydride is $(R^4O)_3SiH$ (Formula XXII), each occurrence of $R^4$ is independently C1-C18 alkyl, C1-C18 substituted alkyl, aryl, or substituted aryl, and $R^4$ optionally contains at least one heteroatom;
wherein the compound containing at least one unsaturated group is selected from the group consisting of a terminally unsaturated amine, an unsaturated aromatic hydrocarbon, an unsaturated cycloalkane, and combinations thereof.

* * * * *

UNITED STATES PATENT AND TRADEMARK OFFICE
CERTIFICATE OF CORRECTION

PATENT NO. : 11,052,383 B2  
APPLICATION NO. : 15/715324  
DATED : September 26, 2017  
INVENTOR(S) : Weller et al.

Page 1 of 1

It is certified that error appears in the above-identified patent and that said Letters Patent is hereby corrected as shown below:

On the Title Page

Item (72) The spelling of Inventor 2:  
Crista Carmen H. Atienza  
Should be corrected to:  
Crisita Carmen H. Atienza Signed and Sealed this  
Ninth Day of August, 2022

Katherine Kelly Vidal  
*Director of the United States Patent and Trademark Office*